United States Patent
Blondel et al.

(10) Patent No.: US 10,922,526 B2
(45) Date of Patent: *Feb. 16, 2021

(54) METHOD FOR 3D OBJECT RECOGNITION BASED ON 3D PRIMITIVES

(71) Applicant: APPLICATIONS MOBILES OVERVIEW INC., Montreal (CA)

(72) Inventors: Danae Blondel, Montreal (CA); Laurent Juppe, Montreal (CA)

(73) Assignee: APPLICATIONS MOBILES OVERVIEW INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/652,927

(22) PCT Filed: Oct. 5, 2018

(86) PCT No.: PCT/CA2018/000186
§ 371 (c)(1),
(2) Date: Apr. 1, 2020

(87) PCT Pub. No.: WO2019/068167
PCT Pub. Date: Apr. 11, 2019

(65) Prior Publication Data
US 2020/0242330 A1    Jul. 30, 2020

(30) Foreign Application Priority Data

Oct. 5, 2017  (LU) ........................................ 100465

(51) Int. Cl.
*G06N 20/00* (2019.01)
*G06K 9/62* (2006.01)
*G06K 9/00* (2006.01)

(52) U.S. Cl.
CPC ........ *G06K 9/00208* (2013.01); *G06K 9/6211* (2013.01); *G06N 20/00* (2019.01)

(58) Field of Classification Search
None
See application file for complete search history.

(56) References Cited

U.S. PATENT DOCUMENTS 8,531,396 B2    9/2013  Underkoffler et al.
9,286,538 B1    3/2016  Chen et al.
(Continued)

FOREIGN PATENT DOCUMENTS

KR    101438011 B1    9/2014
WO    2016/153690 A1  9/2016

OTHER PUBLICATIONS

International Search Report and Written Opinion with regard to PCT/CA2018/000186 completed Jan. 2, 2019.
(Continued)

*Primary Examiner* — Tahmina N Ansari
(74) *Attorney, Agent, or Firm* — BCF LLP

(57) ABSTRACT

The present disclosure proposes a computer implemented of object recognition of an object to be identified using a method for reconstruction of a 3D point cloud. The method comprises the steps of acquiring, by a mobile device, a plurality of pictures of said object, sending the acquired pictures to a cloud server, reconstructing, by the cloud server, a 3D points cloud reconstruction of the object, performing a 3D match search in a 3D database using the 3D points cloud reconstruction, to identify the object, the 3D match search comprising a comparison of the reconstructed 3D points cloud of the object with 3D points clouds of known objects stored in the 3D database.

17 Claims, 25 Drawing Sheets

(56) References Cited

U.S. PATENT DOCUMENTS

| | | | |
|---|---|---|---|
| 9,349,180 B1 | 5/2016 | Ramaswamy | |
| 9,424,461 B1* | 8/2016 | Yuan | G06K 9/00201 |
| 10,373,372 B2* | 8/2019 | Blondel | G06T 15/205 |
| 10,438,406 B2* | 10/2019 | Younas | G06T 19/00 |
| 2010/0066676 A1 | 3/2010 | Kramer et al. | |
| 2014/0211989 A1 | 7/2014 | Ding et al. | |
| 2015/0077326 A1 | 3/2015 | Kramer et al. | |
| 2017/0200307 A1* | 7/2017 | Saha | G06T 17/00 |
| 2018/0190377 A1* | 7/2018 | Schneemann | G06K 9/00275 |
| 2018/0276887 A1* | 9/2018 | Younas | G06T 7/12 |
| 2019/0108677 A1* | 4/2019 | Blondel | G06T 17/00 |

OTHER PUBLICATIONS

English Abstract for KR 101438011 retrieved on Espacenet on Apr. 1, 2020.

Prisacariu et al., "Real-Time 3D Tracking and Reconstruction on Mobile Phones", IEEE Transactions on Visualization and Computer Graphics, 2015, vol. 21, No. 5, pp. 557-570.

Locher et al., "Mobile Phone and Cloud—a Dream Team for 3D Reconstruction", IEEE Winter Conference on Applications of Computer Vision (WACV), 2016, 8 pages.

Tanskanen et al., "Live Metric 3D Reconstruction on Mobile Phones", CVF, ICCV2013 paper, IEEE Xplore, 2013, pp. 65-72.

Muratov et al., "3DCapture: 3D Reconstruction for a Smartphone", CVF, CVPR Workshop paper, IEEE Xplore, 2016, pp. 893-900.

\* cited by examiner

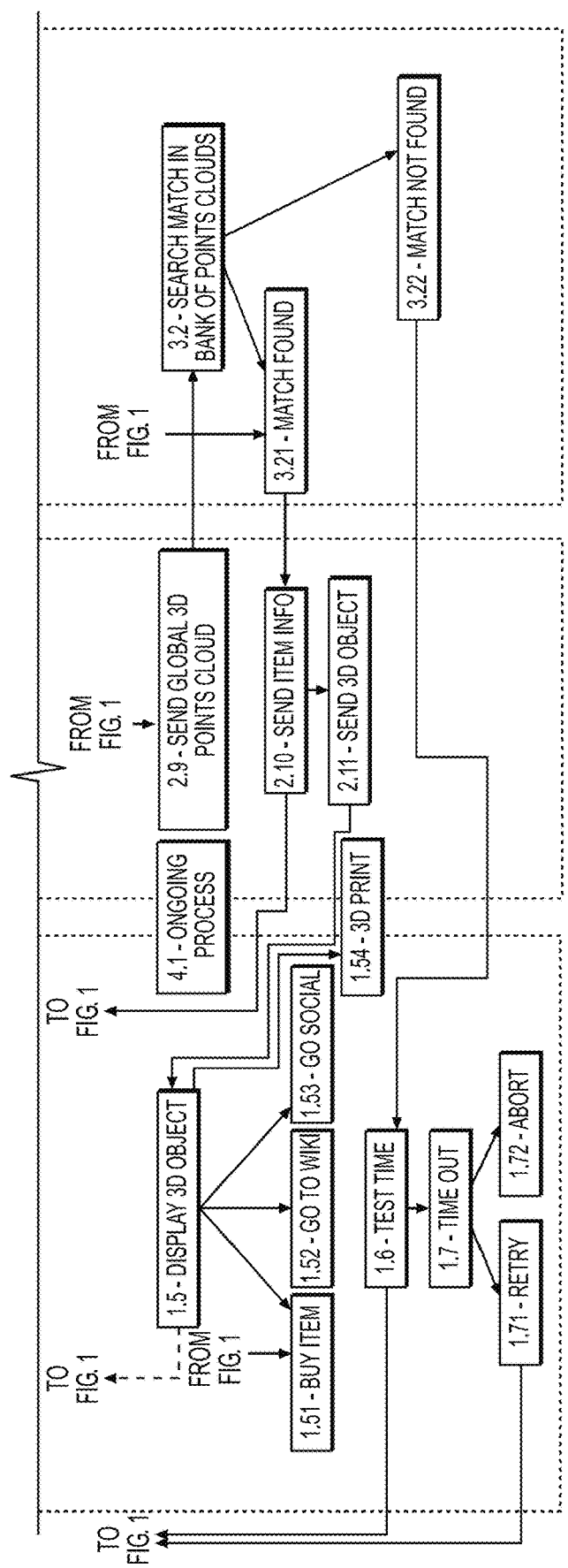

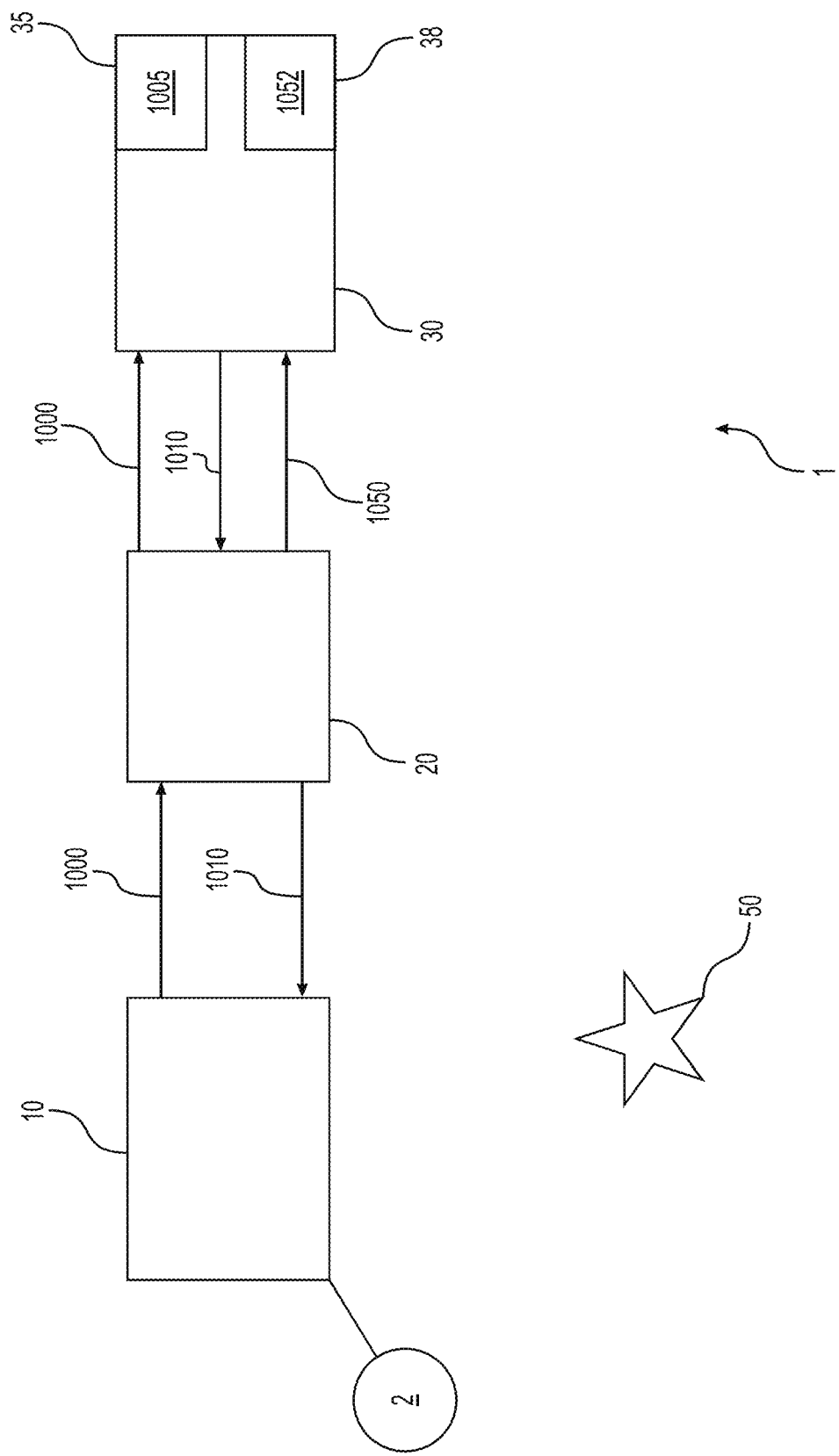

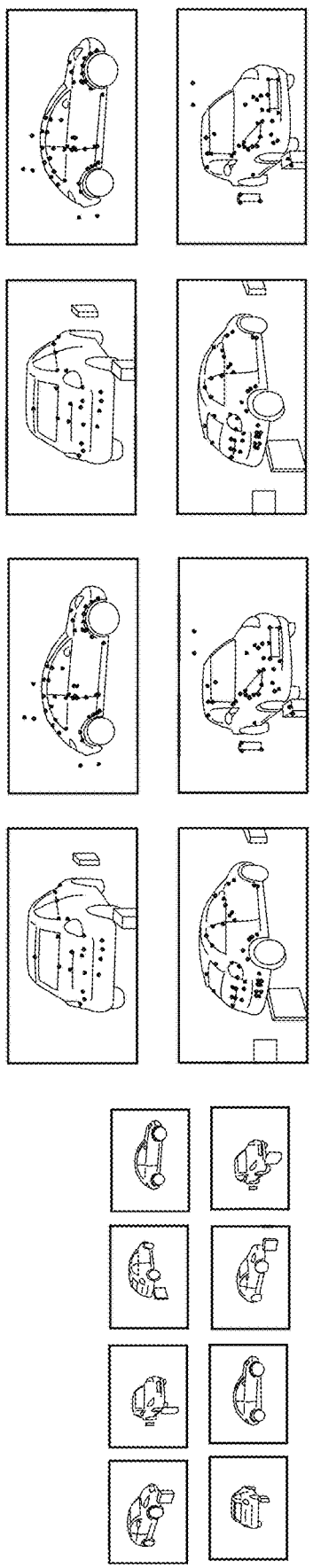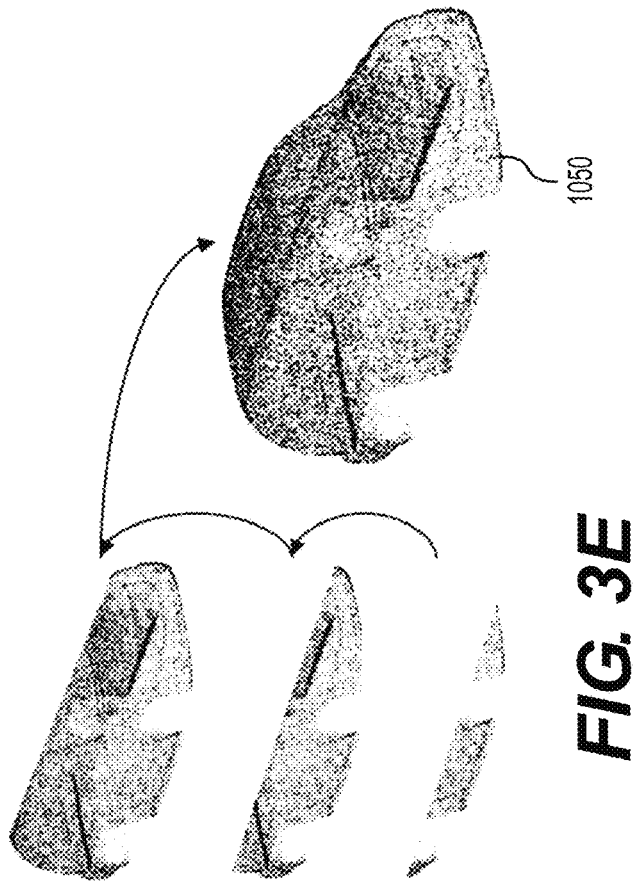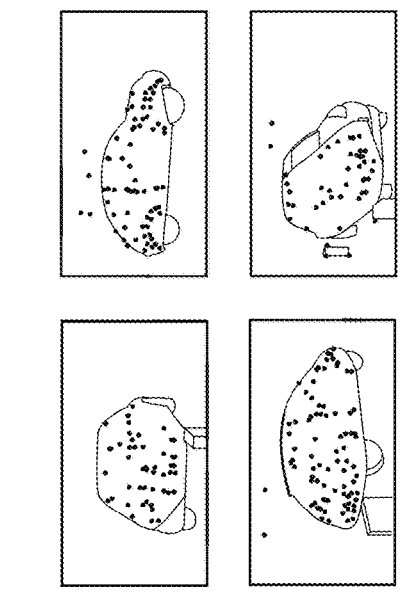
FIG. 3A
FIG. 3B  SEARCHABLE POINTS 1032
FIG. 3C  SAME POINTS (KEY POINTS) 1030
FIG. 3D
FIG. 3E

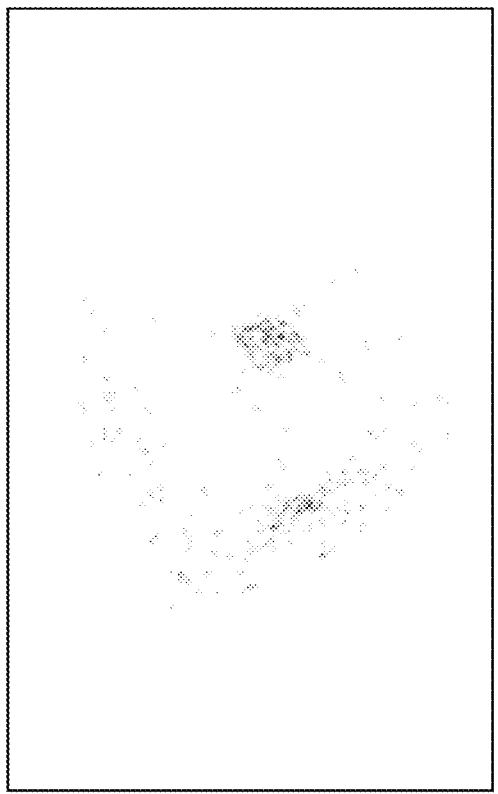
30 PICTURES
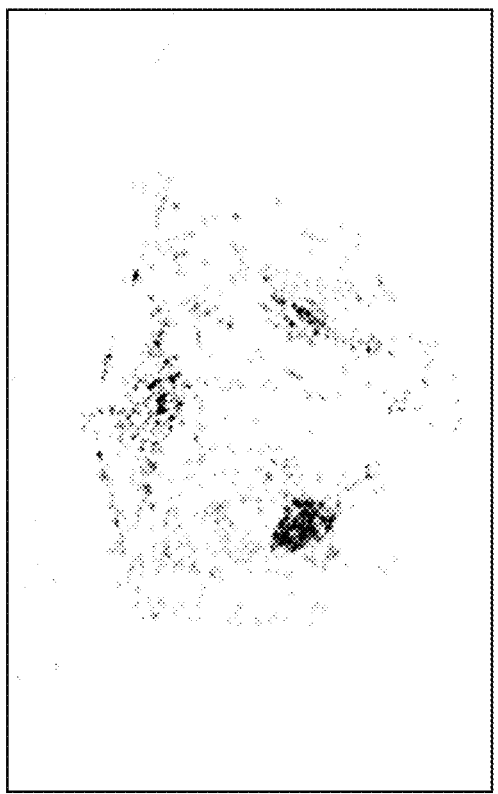
150 PICTURES
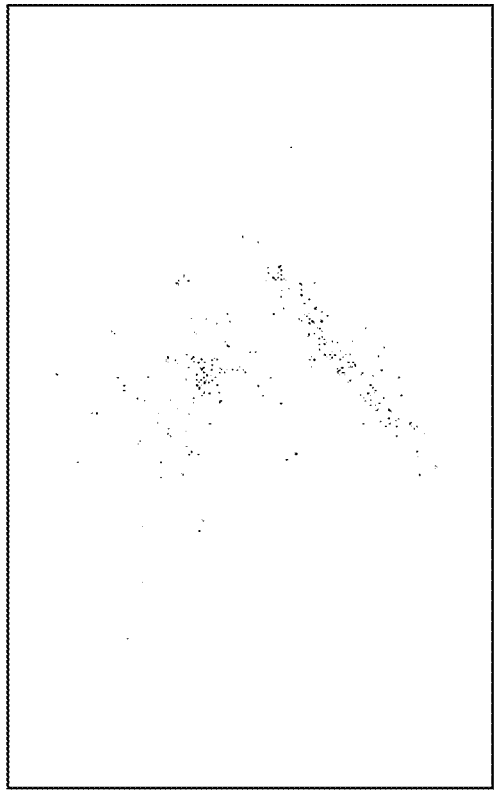
20 PICTURES
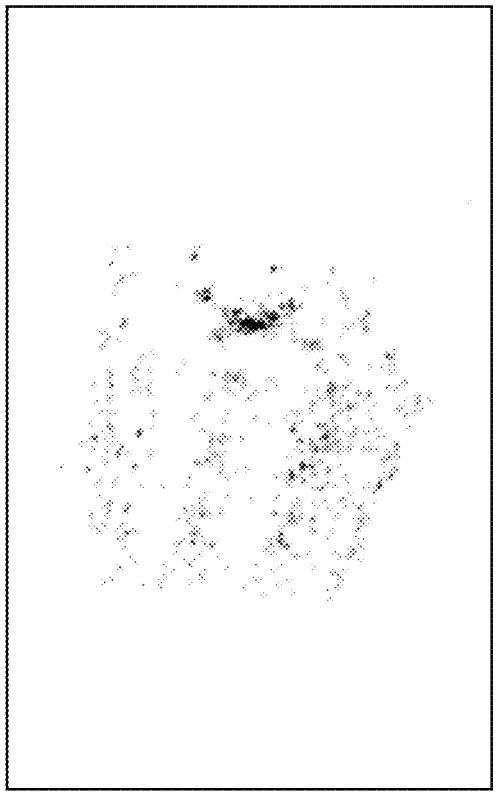
120 PICTURES
FIG. 4

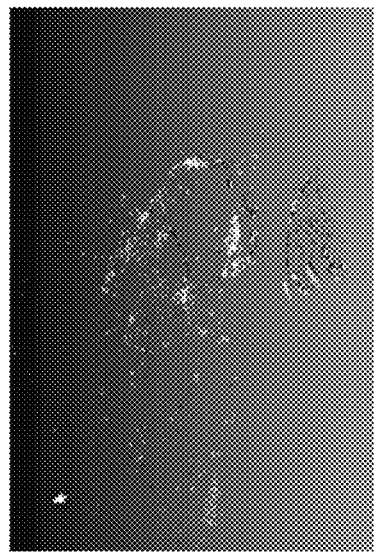
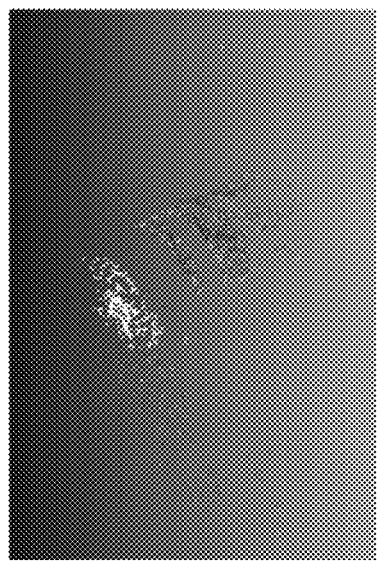
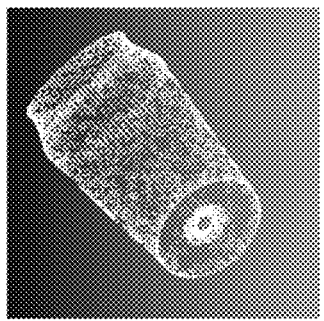
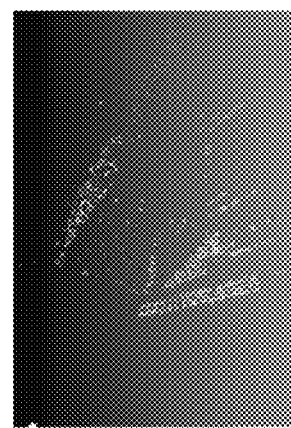
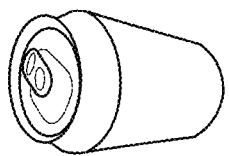
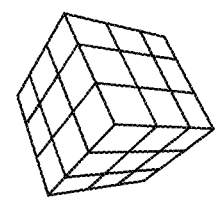
FIG. 5

| ORIGINAL CHAIN | 0 | 1 | 0 | 0 | 1 | 1 | 1 | 0 | 0 | 0 | 1 | 0 | 1 | 0 | 1 |
|---|---|---|---|---|---|---|---|---|---|---|---|---|---|---|---|
| ENCODED CHAIN | 1 | 1 | 0 | 0 | 1 | 5 | | 4 | 3 | | | 8 | | | 4 |

| DICTIONARY | 0 | 1 | 10 | 00 | 01 | 11 | 110 | 000 | 010 | 0100 | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |

FIG. 9

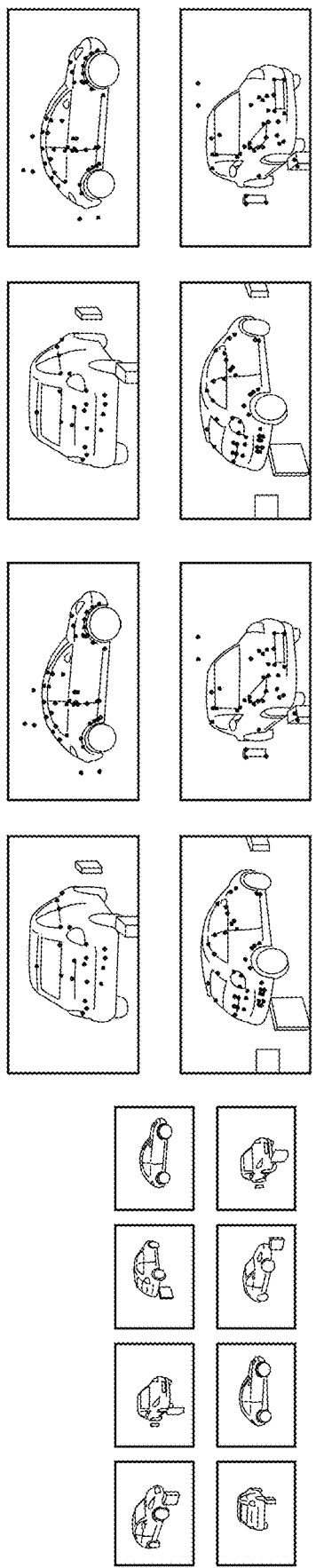
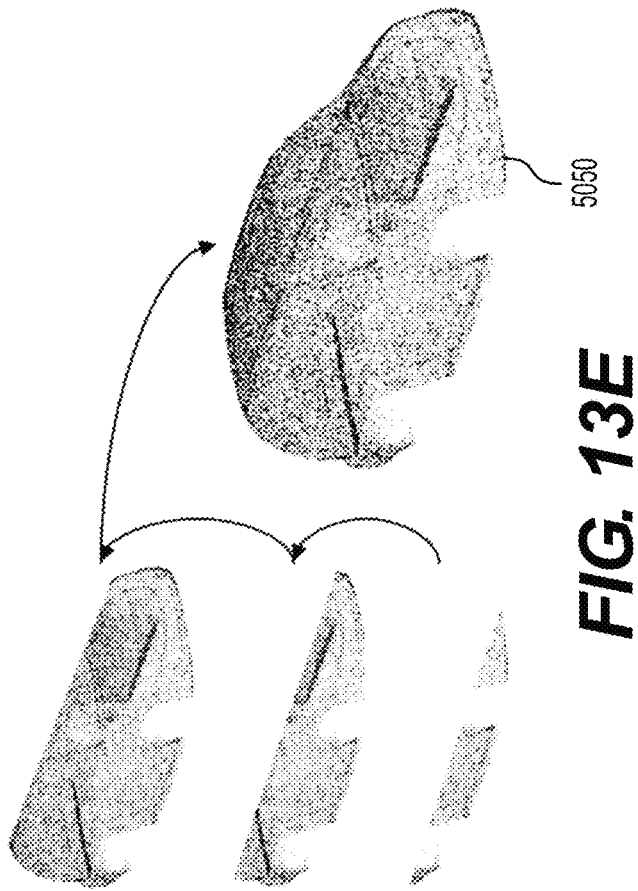
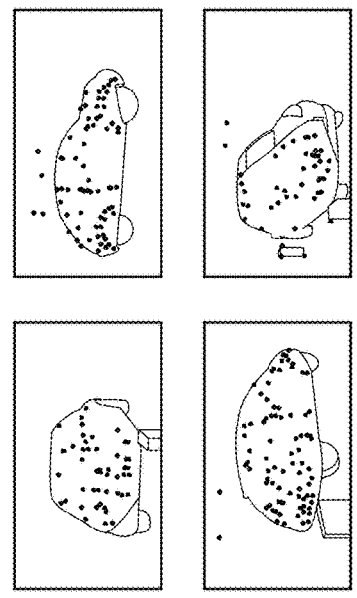
FIG. 13A
FIG. 13B SEARCHABLE POINTS 5032
FIG. 13C SAME POINTS (KEY POINTS) 5030
FIG. 13D
FIG. 13E

1- GENERATION OF DEEP
MATCHING SIFT FILES AND
MATCHING FILE.

2- GENERATION OF SFM SIFT FILES.

DEEP MATCHING ORIGINAL SIFT FILE

```
IMG1.JPG
4 (NUMBER OF PIXELS)
0 2 ((X:Y) OF PIXELS)
1 1
1 2
2 2
```

MATCHING FILE

```
[IMG1.JPG IMG2.JPG 4
3 5 6 9
2 4 5 8]
```

SFM ORIGINAL SIFT FILE (ONLY 3 POINTS)

```
IMG1.JPG
3 128
0 2 14.38 -2.732
3 12 23 38 10 15 78 20 39 67 42 8 12 8 39 35 118 43 17 0
0 1 12 109 9 2 6 0 0 21 46 22 14 18 51 19 5 9 41 52
65 30 3 21 55 49 26 30 118 118 25 12 8 3 2 60 53 56 72 20
7 10 167 88 23 13 15 12 11 11 71 45 74 49 82 38 38 91
118 15 2 16 33 3 5 118 98 38 6 19 36 1 0 15 64 22 1 2
6 11 18 61 31 30 6 15 23 118 118 13 0 0 35 38 18 40 96
24 1 0 13 17 3 24 98
1 1 11.45 -2.910
94 32 7 2 13 7 5 23 121 94 13 5 0 0 4 59 13 30 71 32
0 6 32 11 25 32 13 0 0 16 51 5 44 50 0 3 33 55 11 9
121 121 12 9 6 3 0 18 55 60 48 44 44 9 0 2 106 117 13 2
10 1 1 37 1 1 25 80 35 15 41 121 30 2 14 3 2 121
51 11 0 20 93 6 0 20 109 57 3 4 5 0 0 28 21 2 0 5
13 12 75 119 35 0 0 13 28 14 37 121 12 0 0 21 46 5 11 93
29 0 0 3 14 4 11 99
2 2 13.65 2.815
6 105 49 19 3 2 33 27 1 29 26 20 94 51 22 4 0 0 0 2
51 12 0 0 0 0 0 0 0 0 15 122 54 18 26 42 0 0
66 122 55 16 63 13 0 14 1 1 13 122 33 0 0 0 0 0 0
0 0 0 101 41 1 0 63 61 2 13 122 29 0 0 24 34 11 81
13 0 0 0 122 122 11 15 0 0 0 0 20 9 0 0 81 4 0 0
30 46 49 76 122 1 8 5 9 20 32 122 11 0 9 52 122 103 11 17
0 0 0 21 96 14 0 0
```

3- AUGMENTATION OF SFM SIFT
FILES WITH DEEP MATCHING
TRACKED EXTRA PIXELS.

SFM AUGMENTED SIFT FILE
(« EMPTY » POINTS ADDED)

IMG1.JPG
4 128
0 2 14.38 -2.732
3 12 23 38 10 15 78 20 39 67 42 8 12 8 39 35 118 43 17 0
0 1 12 109 9 2 6 0 0 21 46 22 14 18 51 19 5 9 41 52
65 30 3 21 55 49 26 30 118 118 25 12 8 3 2 60 53 56 72 20
7 10 16 7 88 23 13 15 12 11 11 71 45 7 4 49 82 38 38 91
118 15 2 16 33 3 5 118 98 38 6 19 36 1 0 15 64 22 1 2
6 11 18 61 31 3 0 6 15 23 118 118 13 0 0 35 38 18 40 96
24 1 0 13 17 3 24 98
1 1 11.45 -2.910
94 32 7 2 13 7 5 23 121 94 13 5 0 0 4 59 13 30 71 32
0 6 32 11 25 32 13 0 0 16 51 5 44 50 0 3 33 55 11 9
121 121 12 9 6 3 0 18 55 60 48 44 44 9 0 2 106 117 13 2
1 0 1 1 37 1 1 25 80 35 15 41 121 3 0 2 14 3 2 121
51 11 0 20 93 6 0 20 109 57 3 4 5 0 0 28 21 2 0 5
13 12 75 119 35 0 0 13 28 14 37 121 12 0 0 21 46 5 11 93
29 0 0 3 14 4 11 99
1 2 9.16 -0.080
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0
2 2 13.65 2.815
6 105 49 19 3 2 33 27 1 29 26 20 94 51 22 4 0 0 0 2
51 12 0 0 0 0 0 0 0 0 0 0 15 122 54 18 26 42 0 0
66 122 55 16 63 13 0 1 4 1 1 3 122 33 0 0 0 0 0 0
0 0 0 0 101 41 1 0 63 61 2 13 122 29 0 0 24 34 11 81
13 0 0 0 122 122 11 15 0 0 0 0 20 90 0 81 4 0 0
30 46 49 76 122 1 8 5 9 20 32 122 11 0 9 52 122 103 11 17
0 0 0 21 96 14 0 0

FROM FIG. 16 →

→ TO FIG. 16 CONT.-1

EXAMPLE OF AN « EMPTY » BUT
RELEVANT POINT ADDED FROM DEEP
MATCHING.

FIG. 16 CONT.

4- COMPUTATION OF COMPATIBLE
FEATURE FOR THE AUGMENTED FILE,
I.E. PIXELS THAT HAVEN'T BEEN
IDENTIFIED BY SFM.

SFM COMPATIBLE SIFT FILE
(« EMPTY » POINTS COMPUTED)

FROM FIG. 16
CONT.

```
IMG1.JPG
4 128
0 2 14.38 -2.732
3 12 23 38 10 15 78 20 39 67 42 8 12 8 39 35 118 43 17 0
0 1 12 109 9 2 6 0 0 21 46 22 14 18 51 19 5 9 41 52
65 30 3 21 55 49 26 30 118 118 25 12 8 3 2 60 53 56 72 20
7 10 16 7 88 23 13 15 12 11 11 71 45 7 4 49 82 38 38 91
118 15 2 16 33 3 5 118 98 38 6 19 36 1 0 15 64 22 1 2
6 11 18 61 31 3 0 6 15 23 118 118 13 0 0 35 38 18 40 96
24 1 0 13 17 3 24 98
1 1 11.45 -2.910
94 32 7 2 13 7 5 23 121 94 13 5 0 0 4 59 13 30 71 32
0 6 32 11 25 32 13 0 0 16 51 5 44 50 0 3 33 55 11 9
121 121 12 9 6 3 0 18 55 60 48 44 44 9 0 2 106 117 13 2
1 0 1 1 37 1 1 25 80 35 15 41 121 3 0 2 14 3 2 121
51 11 0 20 93 6 0 20 109 57 3 4 5 0 0 28 21 2 0 5
13 12 75 119 35 0 0 13 28 14 37 121 12 0 0 21 46 5 11 93
29 0 0 3 14 4 11 99
1 2 9.16 -0.080
15 32 39 72 23 3 5 9 56 19 10 55 46 11 47 70 118 36 2 5
37 2 6 54 4 1 0 4 104 3 0 0 111 33 56 45 3 0 5 118
53 23 14 80 44 6 38 107 118 74 9 19 43 1 4 19 10 2 0 2
118 5 0 0 64 7 11 13 2 6 116 118 28 5 10 61 41 17 118 49
118 10 3 16 27 2 35 82 10 1 1 35 114 2 0 0 0 0 0 0
0 8 92 5 0 0 0 0 0 2 88 10 6 1 1 7 30 19 17
0 0 0 20 17 0 0 0
2 2 13.65 2.815
6 105 49 19 3 2 33 27 1 29 26 20 94 51 22 4 0 0 0 2
51 12 0 0 0 0 0 0 0 0 0 0 15 122 54 18 26 42 0 0
66 122 55 16 63 13 0 1 4 1 1 3 122 33 0 0 0 0 0 0
0 0 0 0 101 41 1 0 63 61 2 13 122 29 0 0 24 34 11 81
13 0 0 0 122 122 11 15 0 0 0 0 20 9 0 0 81 4 0 0
30 46 49 76 122 1 8 5 9 20 32 122 11 0 9 52 122 103 11 17
0 0 0 21 96 14 0 0
```

EXAMPLE OF AN « EMPTY » BUT
RELEVANT POINT ADDED FROM DEEP
MATCHING AND COMPUTED TO BE
USABLE FOR 3D RECONSTRUCTION.

FIG. 16 CONT.

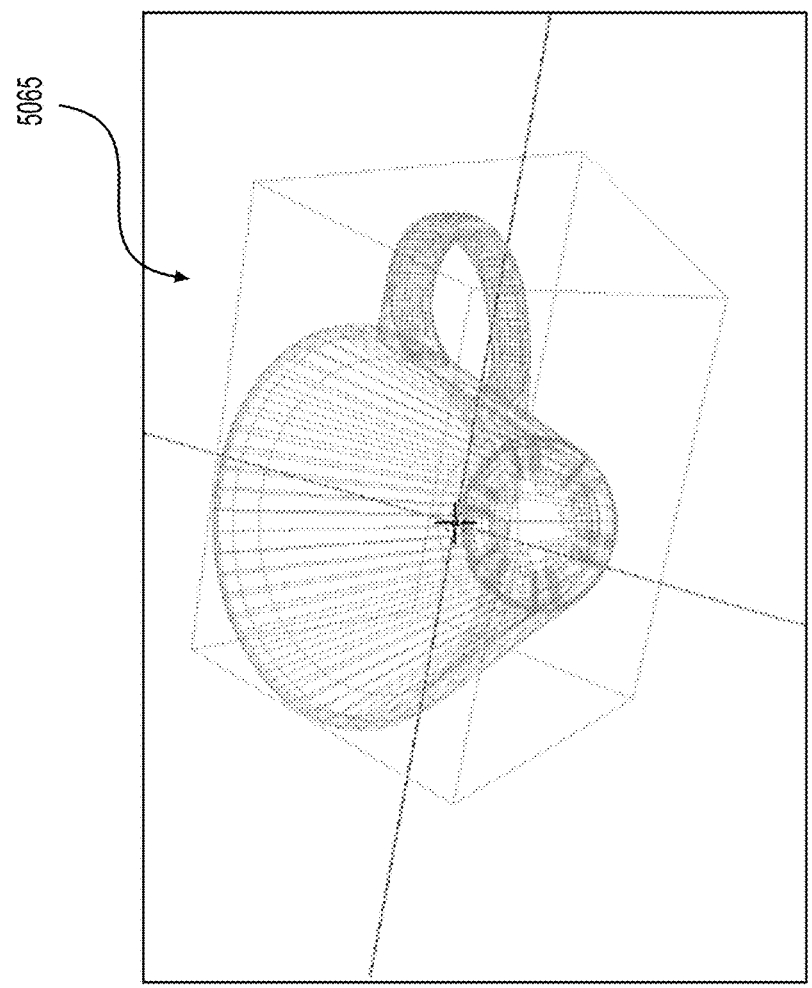
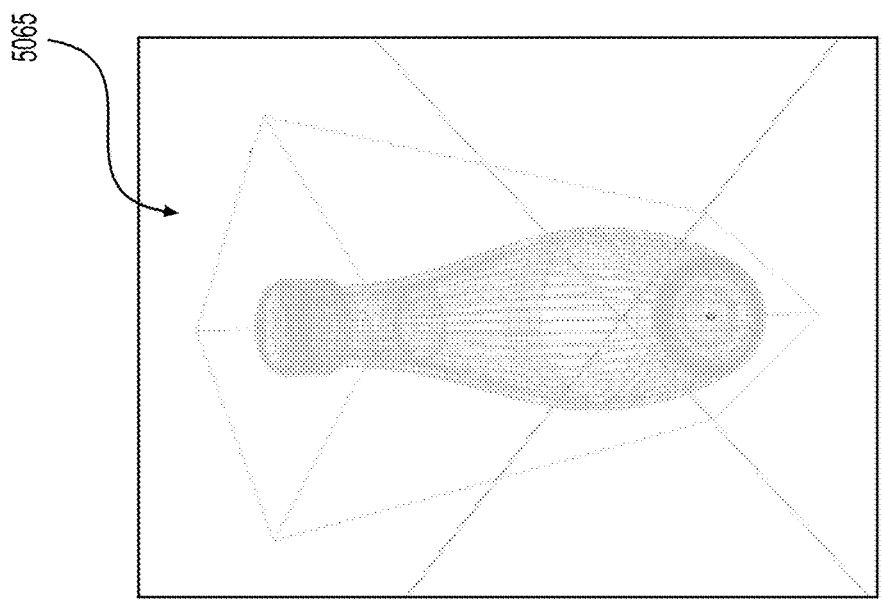
FIG. 18

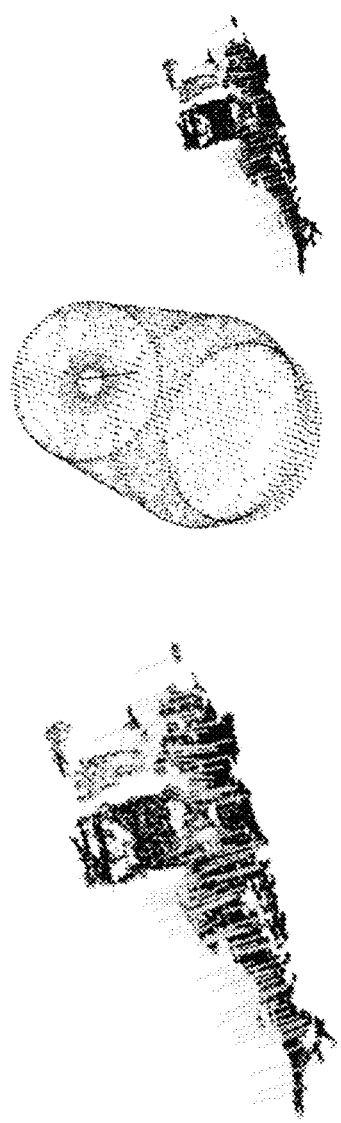
FIG. 19A
FIG. 19B
FIG. 19C
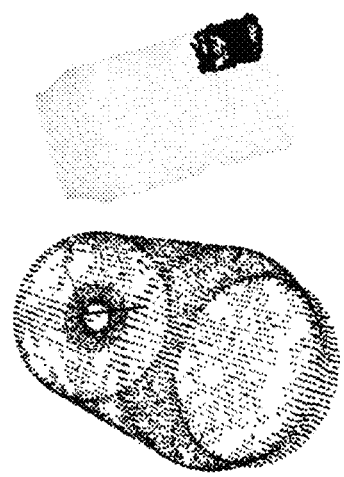
FIG. 19D
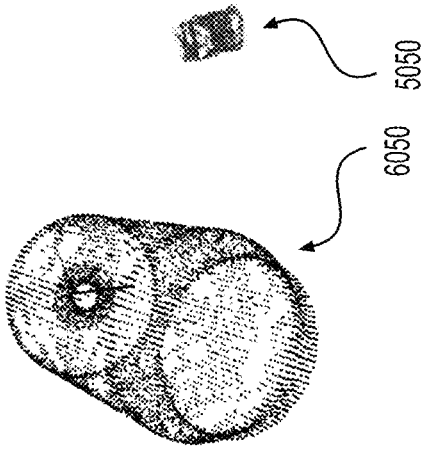
FIG. 19E

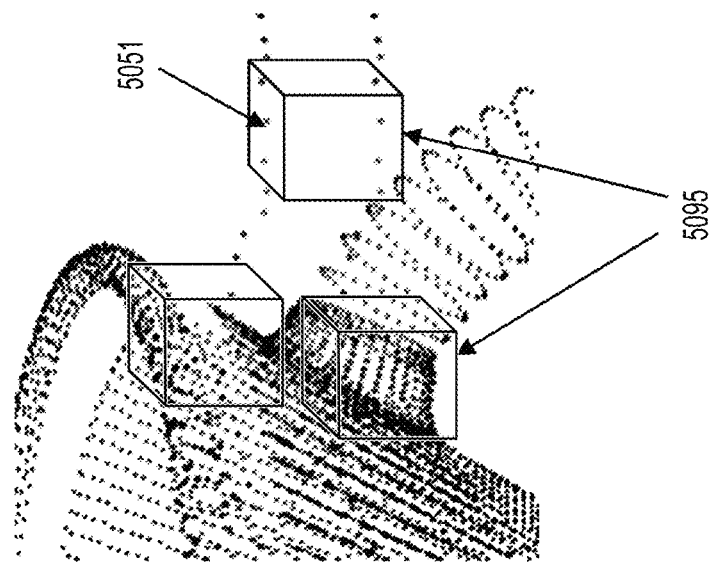
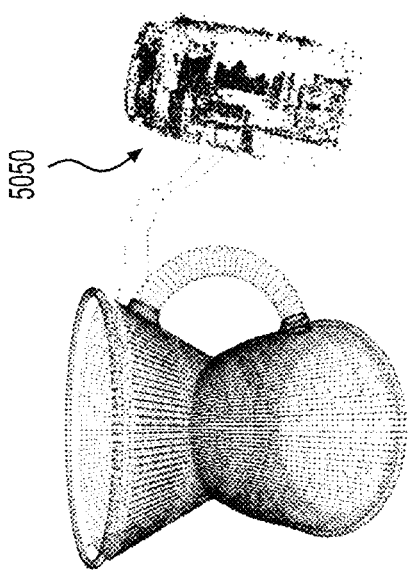
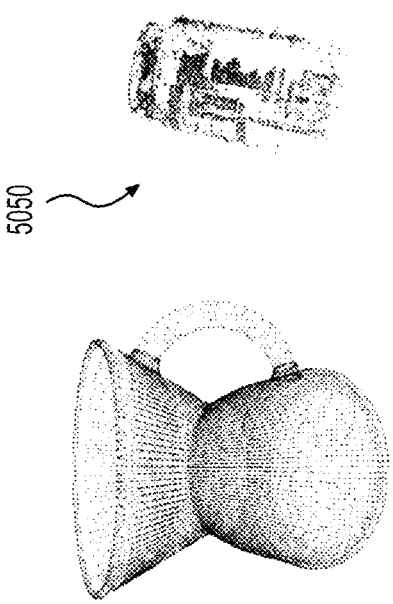
FIG. 20A
FIG. 20B
FIG. 20C

METHOD FOR 3D OBJECT RECOGNITION BASED ON 3D PRIMITIVES

CROSS-REFERENCE TO RELATED APPLICATIONS

This application is a national stage application filed under 35 U.S.C. § 371 of International Patent Application No. PCT/CA2018/000186, filed Oct. 5, 2018, which claims the benefit of Luxembourg Patent Application No. LU100465, filed Oct. 5, 2017.

STATEMENT REGARDING FEDERALLY SPONSORED RESEARCH OR DEVELOPMENT

None

BACKGROUND OF THE INVENTION

Searching, identifying, connecting an object to the network is one of the major issues of years to come. As we can see the World Wide Web becoming more and more mobile, this recognition processes and techniques have to be adapted to mobile users and thus mobile devices. Several techniques have yet been developed to do so, such as 2D picture analysis, optical character recognition (O.C.R.), QR-Codes or Bar-Codes, geolocation, color recognition. They prove very useful and efficient in particular cases, like O.C.R. for books, geolocation for monuments or QR-codes when present, but lack of efficiency in most cases. Indeed, objects in today's life are mainly defined in 3D and 3D parameters have to be taken in consideration to recognize them. Those parameters include peaks, tops, edges, shapes, reliefs.

An object of the invention is to propose a method for recognition of an object using 3D parameters, yet without scanning the object in 3D. With other words, the pre-sent invention's purpose is not to develop a 3D scanner but to use three dimensional parameters to recognize objects.

BRIEF SUMMARY OF THE INVENTION

Therefore, the present invention proposes a computer implemented method of object recognition of an object to be identified, the method comprising the steps of acquiring, by a mobile device, a plurality of pictures of said object, sending the acquired pictures to a cloud server, reconstructing, by the cloud server, a 3D points cloud reconstruction of the object, and performing a 3D match search in a 3D database using the 3D points cloud reconstruction, to identify the object, the 3D match search comprising a comparison of the 3D points cloud reconstruction of the object with 3D points clouds of known objects stored in the 3D database. A 3D point cloud is a data set, so the method comprises comparing the reconstructed 3D data set (3D points cloud reconstruction) with known 3D data sets of known objects.

In an aspect, the comparison of the 3D points cloud reconstruction of the object with 3D points clouds of known objects stored in the 3D database includes at least one of machine learning or 3D geometric comparison. In this aspect, the present invention therefore proposes a method of recognition using 3D points cloud in two noticeable ways: geometrical matching/deep matching on the one hand, and 3D machine learning on the other hand. To achieve these goals, 3D reconstruction of objects is required. Those 3D reconstructed models may be analyzed extracting specific parameters used for further recognition. Those 3D "sub-parameters" feed the recognition pipeline in its two branches (geometrical and machine learning)

In an aspect, the machine learning comprises the step of splitting the 3D point cloud reconstruction into a plurality of 3D descriptors, wherein the 3D descriptors include ones of planes, spheres, cylinders, cones, cubes, and torus, and wherein the 3D descriptors are split into a plurality of 3D primitives associated to the 3D descriptors, and wherein the plurality of 3D primitives are spatially connected through connectivity graphs describing their spatial connectivity forming the object. The 3D search match may be performed using the extracted plurality of primitives and associated connectivity graph. 3D descriptors and geometrical "primitives" from the 3D reconstructed models can be derived, whereby the descriptors are "simple objects", also called "primitives", such as planes, spheres, cylinders, cones, cubes or tori. In a reverse process, any 3D object can be separated in a collection of those elementary shapes. Those elementary shapes are then spatially connected to each other through graphs than describe their spatial connectivity to form the whole object. The combination of matching small objects (primitives) with their connectivity graphs is a tool for an efficient matching.

In yet another aspect, the method comprises performing a first search match in a first database in which known objects are stored with known metadata associated with the known objects, the first search match being performed using 2D recognition techniques including at least one of Optical Character Recognition, SIFT based imaging, color gradient analysis, and/or the first search match being performed on the metadata The steps of the method may be performed concurrently, until the object has been identified in at least one of the first database or of the 3D database, in particular pictures are acquired as long as the object has not been acquired or until a time out has been reached, wherein database indexation of the 3D database and/or of the first data-base is updated each time a known object stored in the 3D database or in the first data-base is eliminated, in particular using metadata or bounding boxes representative of the dimensions of the object to be identified.

In an aspect, the step of acquiring a plurality of pictures comprises extracting said pictures from a video sequence, the method comprising dynamically adjusting the acquisition parameter depending on the 3D points cloud reconstruction, wherein pictures from the video sequence are saved every «n» frame, and wherein «n» being adjusted dynamically or by the user, in particular wherein n is given a higher value at the start of the method and decreases as the reconstruction becomes more accurate.

In another aspect, the step of reconstructing a 3D points cloud reconstruction of the object comprises extracting a plurality of key points that can be correlated in said plurality of pictures of the object, wherein at least two pictures of the plurality of pictures show at least two different viewpoints of the object, placing the key points on the object, defining a plurality of vertices of the object, wherein a vertex corresponds in 3D to a specific points identified in at least 3 pictures of the object, and adding the 3D vertices to build a reconstructed 3D points cloud of the object, to derive the 3D points cloud reconstruction of the object.

In this aspect, the present method is adapted to identify and treat essential 3D parameters extracted from the 3D reconstruction as key points of an object, such as peaks, tops, edges, shapes, reliefs, as well as its texture, colors, materials . . .

The 3D reconstruction may include a step of denoising the 3D points cloud re-construction, wherein the denoising includes sampling the 3D reconstructed space with a plurality of virtual voxels, counting the number of vertices contained in a virtual voxel, and deleting said vertices containing in the virtual voxel when the number of said vertices in the virtual voxel is below a vertex threshold. A size of the virtual voxel and the vertex threshold may be dynamically adjustable.

In yet another aspect, the step of reconstructing a 3D point cloud reconstruction of the object comprises extracting a plurality of key points that can be correlated in said plurality of pictures of the object, wherein at least two pictures of the plurality of pictures show at least two different viewpoints of the object, placing the key points on the object, defining a plurality of 3D slices of the object, wherein a 3D slice comprises at least one key point, and adding the 3D slices to build a reconstructed 3D points cloud of the object, to derive the 3D points cloud reconstruction of the object.

The method may comprise computing a calibration matrix in a reference frame to derive a relative measurement system, wherein the 3D slices are added in the obtained relative measurement system.

In an aspect, the method comprises defining an initial set of searchable points in a first picture of the plurality of pictures and identifying some of the searchable points in the remaining pictures of the plurality of pictures, to extract the key points.

Displaying in real time information pertaining the method on the mobile device may be performed, wherein the mobile device may comprise an input device allowing a user to enter input data concerning the object to be identified, and wherein the first match search or the 3D match search are adapted depending on the input data.

The present disclosure has needs to reconstruct objects in 3D to extracts specific features for further recognition has led the inventors to combine and connect techniques of 2D tracking with 3D reconstruction. Techniques of "deep matching" that are working at a sub-pixel scale are used to find 2D correspondences between 2D pictures at the pixel level as SFM algorithms work on numerous neighboring pixels in an area defined by a radius around a central pixel.

The general operating of the method of object recognition of an object of this disclosure is to observe an object with a device from as many angles as possible. The information acquired by the device is distantly computed and compared to information contained in an object database. As soon as a match is found, the object from the data-base is displayed. It is important to note that the object that is further used once recognized is the object from the database, not the one that has been captured.

The 3D approach of the present disclosure gives the opportunity to use 2D recognition techniques in all the view angles of an object, thus allowing watching and analyzing the object on all their sides and picking up every detail that will help to recognize the object. Unlike most approaches that are aiming to fully and densely reconstruct captured objects (3D scanning, facial recognition, printable 3D objects and formats), the present application uses calculated 3D parameters as a unique signature for an object. This is achieved using points clouds techniques which allow fast (within seconds) and efficient 3D representation of captured objects but also accurate comparison with an existing 3D database. Open source "Point Clouds Libraries (PCL)" and more recent "Geometry Factory Librairies" can be used for developing the software.

Should the object have an existing 3D representation, this representation can be displayed to the user in order to have a 3D interactive representation of the object; If this 3D pre modeled object be available, it could be printed through a 3D printer, . . .

In the present application the term "object" is used to designate anything that can be captured by the device. It can be any object; natural, artificial, articulated, soft, hard . . . as long as a picture/video can be shot or taken to represent said object.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

DESCRIPTION OF THE DRAWINGS

The invention is described hereinafter with reference to the enclosed drawings, in which:

FIGS. 2 is an overview of a method for object recognition according to one aspect of the disclosure.

FIGS. 3A-3E are examples of picture date at different stages of the method of FIG. 1.

FIG. 4 showing a level of 3D detail depending of the input number of pictures used in the method of FIG. 1.

FIG. 5 shows examples of an object and its 3D reconstruction according to one aspect of the disclosure.

FIG. 9 shows an example of compression usable in a method according to one aspect of the present disclosure.

FIGS. 13A-3E are examples of picture data at different stages of the method of FIG. 1.

FIG. 16 is an overview of a method for combining SFM matching techniques and deep matching techniques in an aspect of the disclosure.

FIG. 18 gives an example of decimation of a database doing object recognition in an aspect of the disclosure.

FIG. 19A-19E is an example of different steps of the method of object recognition in one aspect of the disclosure.

FIG. 20A-20C shows denoising and cleaning usable in a method of FIG. 19A-19E in an aspect of the disclosure.

DETAILED DESCRIPTION OF THE INVENTION

Figure 1:
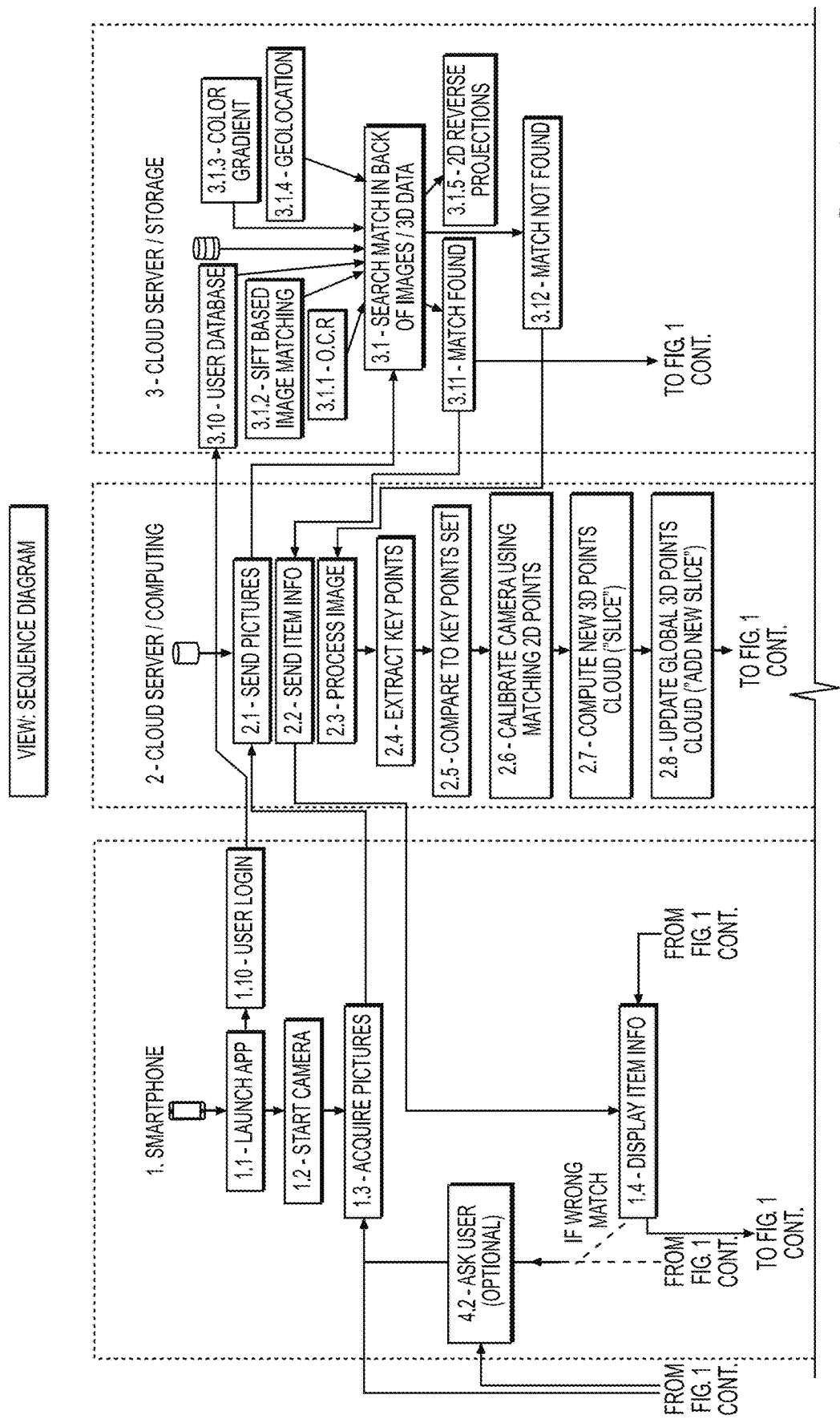
FIGS. 1 is an overview of a system for object recognition in one aspect of the disclosure.

FIG. 2 is an overview of the system 1 for object recognition of an object 50. The system 1 comprises a device 10, which is used by an end user. The device 10 preferably comprises a display screen, camera and video camera, embedded CPU, storage capacities, a connection to a network. The device 10 may have connections to existing platforms 2, such as M-commerce, 3D printing, CRM, social networks.

For example, the device 10 can be a smartphone, a tablet, a laptop with web cam, a computer, or the like. As will be understood by the skilled person, smartphones and tablets are most efficient devices for the method of the present invention.

The device 10 is connected to a cloud server 20. The cloud server 20 comprises distant CPUs or GPUs facilities. The cloud server 20 can be mainly be provided by recognized actors in the domain, such as Azure (Microsoft), AWS (Amazon), Cisco, Google, HP, or more specialized cloud computing provider, as long as the providers offer efficiency, security and a worldwide presence. In one aspect of the disclosure, power and efficiency of the cloud server 20 can be adapted to the amount of calculation to be processed.

The cloud server 20 has a connection to a storage server 30. The storage server 30 is a distance storage involving both objects and user data, as will be explained in the present disclosure. The storage server 30 comprises a first database 35 and a second database 38. The first database 35 comprises stored images in a 2D dimension. The second database 38 comprises stored 3D files of images.

FIG. 2 is an overview of a method for object 50 recognition according to one aspect of the invention, and described with reference to the system shown on FIG. 1.

The method comprises the step of acquiring a plurality of pictures 1000 of an object 50 (node 1.3). In one aspect of the invention, pictures can be acquired or captured by the device 10. Two different acquisition modes can be used: extraction from video or burst mode. In the burst mode, pictures are taken in photographic mode as quick as the device 10 allows it. The skilled person will understand that the acquisition of pictures using extraction from video is more automatic but also more space and CPU consuming. Pictures from a video sequence shot by the video camera of the user's device can be saved every «n» frame, «n» being adjusted dynamically or by the user, representing in some way the «quality» of the 3D scanning. For example, if n<10 frames, the quality is better but the process is slower. On the other hand, if n>50 frames, the scanning is of lower quality but the process faster. In an aspect of the disclosure, «n» is dynamically adjusted, starting with a high value (+/−50 frames) and decreasing as the reconstruction becomes more accurate (+/−10 frames).

The burst mode is more "clever" and should require some fine computing to select "proper" frames, i.e. frames that are useful for a more accurate 3D "cloud points" reconstruction. Examples of pictures 1000 are shown on FIG. 3A.

It should be noted that objects should preferably been shot from various angles. In case of big objects or objects that cannot be turned around like monuments, only specific angles can be used. The different pictures 1000 for the object 50 represents different views from the object, from different viewpoints.

The pictures 1000 are acquired until a full set of pictures is acquired.

A set of pictures may be considered completed after a certain acquisition time. For example, an acquisition time estimated to 10-15 seconds might be enough. Preferably, an overall time out can be set to avoid infinite looping in the process.

In one aspect of the disclosure, the length of the acquisition time is dynamic and may be adapted depending on a 3D points cloud reconstruction, as will be explained later in this disclosure with reference to nodes 2.3 to 2.9.

The device 10 sends the acquired plurality of pictures 1000 to the cloud server 20 for cloud computing (node 2.1). As will be explained in the following, a first 2D search match in the databank 35 and/or a 3D cloud reconstruction followed by a second 3D search match is performed.

The cloud server 20 forwards the plurality of pictures 1000 to the storage server 30.

A first search match in the database 35 may be performed in order to match the acquired pictures with a known image 1005 stored in the first database 35 (node 3.1).

The first search match is based on 2D image recognition techniques. Those 2D recognition techniques are implemented in the matching algorithm. Different 2 D recognition techniques can be implemented, such as open source techniques. The 2D recognition technique include at least one of O.C.R (node 3.1.1), Scale Invariant Feature Transform—SIFT based image matching (i.e. automatic recognition of key elements in a picture) (node 3.1.2), color gradient analysis (node 3.1.3) giving a precise color map of the object 50. Geolocation information (node 3.1.4) may be used as well.

Each time a non-fitting object stored in the database 35 is eliminated by either one of these techniques, database indexation is updated in order to ease the overall process.

Figure 6:
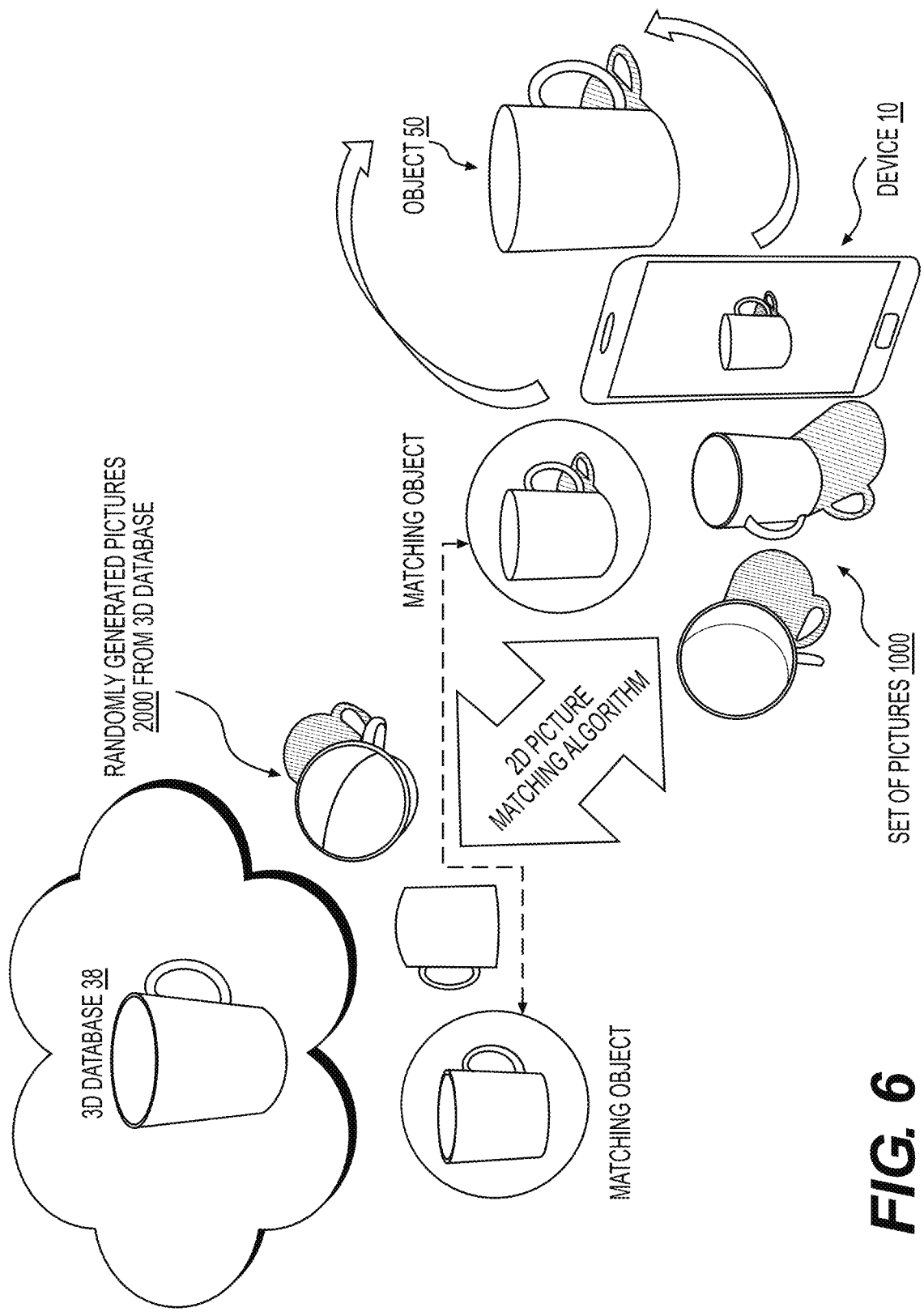
FIG. 6 is an overview of a method for generating random pictures for 2D picture matching used for object recognition according to one aspect of the disclosure.

Node 3.1.5 and FIG. 6 describe an original approach referred to as "2D reverse projections from 3D objects". The 3D stored models of objects or 3D files of image in the database 35 are provided with complete metadata describing the object. For example, the metadata comprises the following identification data: name, brand, description, size, 2D parameters (colors gradients or maps, o.c.r. data, histograms, Fourier Transformations, samplings . . . ), 3D parameters (points cloud representations, triangulation, textures, materials, size, intrinsic dimensions . . . ). Among these parameters, it is assumed that the 3D representation of the objects generates numerous "random" 2D pictures, for an object. This "in house" piece of code generates a plurality of 2D pictures 2000 rendered from the 3D stored model, in order to simulate as many users' captures as possible. This includes different random lightings, different random points of view, different random exposures . . . and thus simulate a user's capture. This 2D pictures generation sends back, in 2D pictures, comparison through Hausdorff distance or Kullback-Leibler distance for example.

Therefore, the 2D reverse projections from 3D object is adapted to simulate the capture of the object 50 by the user and to propose as many "artificial" pictures 2000 as possible to compare them to the picture set 1000 of the object 50 sent by the user. 2D comparison of the artificial pictures 2000 and of the acquired pictures 1000 is processed along the other techniques for final matching.

If the first search match is successful, the storage server 30 sends item 1010 of relevant information belonging to the known image 1005 back to the cloud server 20 which forwards said item 1010 to the device 10 for display.

The item 1010 may comprise identification information of the object, a picture of the object, a localization information of the object, and the like.

If the first search match is not successful, the storage server 30 returns the information to the cloud server 20 that the first search match was not successful (node 3.12). The cloud server 20 starts a 3D reconstruction process in order to obtain a cloud of 3D points from the 2D picture set, followed by a followed by a 3D search match.

This 3D reconstruction process, done by cloud server 20, is shown in nodes 2.3 to 2.9. As will be detailed below, the 3D reconstruction process includes an identification of the 2D pictures set, a 2D tracking in the pictures, a 3D points set placement and 3D points cloud reconstruction. openMVG libraries may be used or any libraries known to the skilled person.

The pictures 1000 are analyzed at node 2.3 to identify the pictures 1000 and extract identification information pertaining to the picture set, such as the acquisition mode, the length of frame acquisition, the identification of frames for the 3D cloud reconstruction.

Using this identification information, a key point extraction process is launched on the pictures 1000, in order in order to extract key points 1030. Key points are defined as being points that can be correlated in as many pictures as possible.

The key points 1030 are identified by a 2D tracking process throughout all the pictures 1000 of the set of pictures, in which each point from a picture is identified in other pictures. If the pictures were acquired though a video, pictures corresponds to frames of the video. In other words, an initial set of searchable points 1032 is defined in a first picture, and the 2D tracking process tries to identify the searchable points 1032 in the other pictures of the set to extract the key points 1030. This is shown on FIG. 3B and 3C.

The searchable points are refined throughout the process. Points are added, other are suppressed. During the key point extraction process, the set of key points is compared to the initial set of searchable points. Should the number of key points be too low, other searchable points would have to be added to the initial set of searchable points in order to be tracked again. There is no really minimum in the number of key points to be tracked, but the 3D reconstruction and the following comparison process is more efficient with dozens of points, as illustrated on FIG. 4 showing a level of 3D detail depending of the input number of pictures.

The skilled person will further understand that it is important that the object 50 has to be motionless while being captured, to allow a successful key point extraction process.

In order to reconstruct 3D points cloud, the "virtual world" is preferably calibrated to obtain a relative measurement system Indeed, the system will generally not be able to calculate absolute dimensions from the pictures set unless there is in at least one picture a distance reference, i.e. an object 50 which size/dimensions are known. Most of the time, this will not be the case. However, the object 50 will have coherent dimensions although it will not have the right size and proportions. For example, should the end user scan a mug, the system will recognize that the object 50 is a mug but won't be able to determine if this is a regular mug or the same mug in a giant version that could be exposed in front of a store as an advertising totem. Nevertheless, the system will send back an "OK" to the user, considering the mug is a regular one that can be found, bought, shared.

This calibration is made using triangulation algorithms. If two or more cameras whose positioning is well known in space see a specific point, triangulation based on elementary trigonometric formulas can determine the exact position of this specific point in space (i.e. in 3 dimensions). In the reverse process, if one tracked point is seen from different viewpoints (even though these different viewpoints are given by one single moving device), these different viewpoints can be positioned in a 3D space relatively to the tracked points, and thus the captured object.

The calibration is done at node 2.5, in which a camera calibration is done using matching 2D points, as explained below.

In order to reconstruct 3D points clouds from sets of pictures, the 2D pictures should be replaced in a 3D environment, by providing the answers to the following questions: where in space are the pictures taken from, and where in space are located the 2D tracked points.

The geometrical system at the time of capture can be represented on FIG. 6.

The device 10 is represented here through its optical center O and his focal plane ("image plane"). The image of the object 50 is made of numerous points $P(X,Y,Z)$. The correspondence between the camera "C" and the object "P" is given by the following formula: $Pc=CP$, where $Pc$ is the projection of P on the image plane, C the complete camera calibration matrix. The calibration matrix C is related to the device 10 and remains the same for a whole capture session. For example, C can be a 3×4 matrix (12 unknowns).

The method for reconstruction is thus to calculate the calibration matrix C (calibrating the camera) in a reference frame and then to apply the transformation to other frames in order to position as many P points as possible in the space. It should be noted the object P has 3 coordinates and is thus positioned in a 3D space.

The calibration matrix C is calculated knowing a few correspondences between 3D points and their 2D projections on the camera image plane. 2D projections coordinates are known in the image plane, while 3D coordinates are also known in an arbitrary 3D space (i.e. P could be considered for example as the center of the 3D world). $Pc=CP$ provides 2 equations containing 12 unknowns, meaning that at least 6 correspondences must be known in order to solve C. Those correspondences are determined using fiducial based image processing methods.

Once the calibration matrix C is known, a point Q in space can be found through the reverse equation $Q=C-1\ Qc$, where C and Qc are known. Q has 3 coordinates that are 3 unknowns. It thus requires another point of view with the same camera to solve the system and position Q in the 3D space.

These calculations are made without any indication of the real dimensions in space. The reconstructed objects have the right geometry but there is no indication about their sizes unless there is in the camera field of view another object whose dimension is well known. This is, however, not prerequisite for the present disclosure.

Computing tools on geometry and trigonometry can be found in open sources libraries (like openCV), libraries that are available in open source since June 2000. Those libraries provide numerous tools on digital pictures analysis, such as automatic 3D camera calibration matrixes calculation (calibrateCamera, calibrationMatrixValues . . . ) or, 3D triangulation from different 2D pictures (triangulatePoints).

Once the calibration is done, the key points 1030 identified in the key point extraction step are placed on the object 50. This is illustrated on FIG. 3D. The 3D points cloud reconstruction is thereafter made "3D slice" by "3D slice" in the obtained relative measurement system, at nodes 2.7 and 2.8. Those 3D slices are added together to build the reconstructed 3D points cloud 1050 as seen on FIG. 3E.

A 3D slice comprises the key points identified from the pictures 1000 for a specific plane.

The skilled person will understand that this slice by slice 3D cloud reconstruction process could really be compared to the process of printing a regular 2D document that is printed line after line when using a regular inkjet printer. It is also the exact same process when printing a 3D object 50 "slice by slice" while the tray sustaining the printed object 50 is going down each time the printer buses are passing over the previous slice.

The result of the 3D points cloud reconstruction is a file comprising a reconstructed 3D points cloud 1050 in a format understandable to 3D software. A standard file format is a .ply file, which is a regular file format for 3D file. Most 3D software understands and generates this format from and to all other 3D formats (obj, stl, 3DS max, ma, mb . . . ). The ply format is also very efficiently compressible (nondestructive) and transportable through the network, although it is not really an issue here since the 3D points cloud reconstruction and the 3D points cloud comparison are both server side computed. Examples of successfully reconstructed fly files are given in FIG. 5A-5C, showing examples of the object 50 and associated reconstructed points cloud 1050.

The reconstructed 3D points cloud 1050 is forwarded to the storage server 30 for a 3D match search. The 3D match search is done with a 3D points cloud comparison made using the ply files. The comparison compares the user-generated ply file 1050 with known ply files 1052 stored in the 3D database 38. It should be noted that the database ply files 1052, associated with each known object stored in the database, is automatically generated from its 3D model regardless of its original format because the ply files can easily and automatically be generated from most regular files formats. It should be noted that the 3D search match process starts as soon as some 3D points are identified. The 3D search match is then enriched with new reconstructed 3D points as long as the recognition process is going on (i.e. no match is found), giving more and more precision and weight to the 3D part of the recognition.

Two main methods can be used to perform the comparison: 3D geometric comparison or machine learning. The skilled person is aware that 3D geometric comparison is rapidly efficient. Alternative, solutions may be chosen between using existing libraries such as "Points Cloud Libraries" or "Geometry Factory" libraries, which embed root algorithms like point source ray projections, principal component analysis in Eigen-space projections or local sensitivity hashing. Those libraries and root techniques can be applied to compare ply files and find a match, but also to efficiently eliminate non fitting database objects from the identification process, which is almost as important in the matching process.

Machine learning is also very efficient although it needs a high amount of inputs associated to outputs to give good results. Fortunately, the method of the present disclosure allows this high amount of data since database object 50s contain a 3D representation. It is possible to randomly generate a big amount of ply files of any detail level and match them with the known original object 50. This machine learning approach relies on AI algorithms such as HOG linear (Histogram of Oriented Gradients), or cascade classifier of Haar features. It certainly requires an important calculation power since those neural network based techniques are exponential in terms of calculation, but this process can be dealt with independently and upstream the recognition process.

Figure 8:
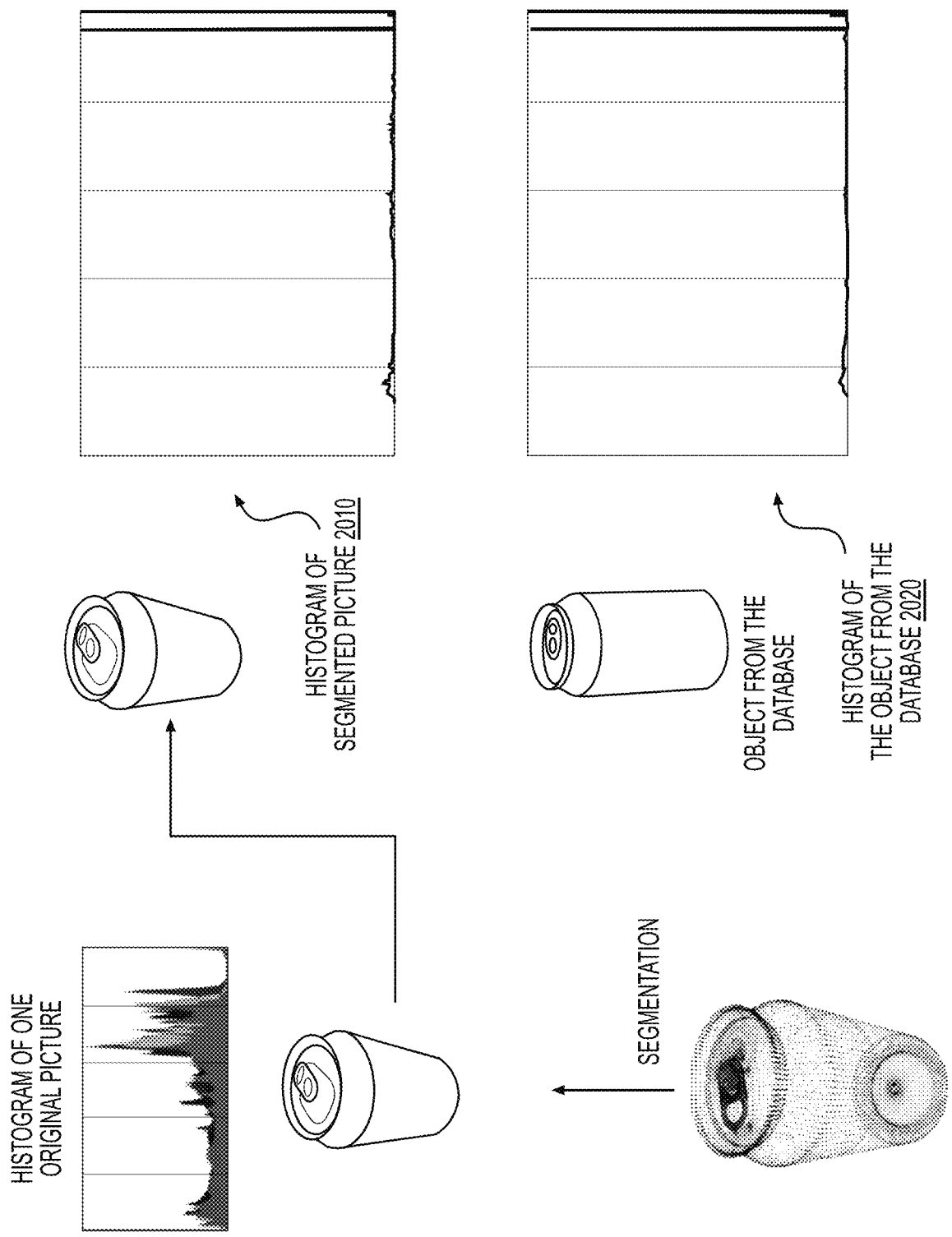
FIG. 8 shows a method of segmentation which can be used in a method of object recognition according to one aspect of the disclosure.

The 3D points cloud reconstruction obtained from pictures as shown on FIG. 5, allows the use of the 3D envelope to do "segmentation" on the reconstructed object. In other words, the 3D object is used in each picture that has been part of the 3D reconstruction to isolate the object in the picture. This is shown on FIG. 8. A matching 3D object from the 3D database 38 is used to isolate relevant information and obtained a histogram 2010 of the segmented picture. The histogram 2010 of the segmented picture can be compared to histograms 2020 of objects in the database 38 and become a criteria of comparison.

This segmentation offers better performances on matching algorithms described in this disclosure, as for example in O.C.R. (characters recognition)—only relevant characters are kept in the analysis—or in color analysis, giving much more accurate histograms as described on FIG. 8. The skilled person will understand that the method for recognition is an ongoing process. It means that during capture of the pictures data, pictures are sent for computing (node 1.3 & 2.1). Hence, first treatments of first pictures are computed to obtain a computed object 50 while further pictures data are being acquired for the same object 50 to be identified. Indeed, the skilled person will understand that pictures are taken as long as necessary, meaning as long as the object 50 has not been identified (although an overall time out can be set, as explained above). Hence, as noted above, the length of the acquisition time is dynamic and may be adapted depending on the 3D points cloud reconstruction made from the dynamic picture set. Thus, if the computed points cloud is not sufficient in terms of number of points, the length of the frames acquisition is extended. Gyroscope/accelerometer if available on the device can also be used to fill up empty areas with 2D pictures. For example, it has been established so far that a minimum of 20 pictures is required. Best results are obtained if the angle between two pictures is rather small, about 1 degree; thus, 20 to 30 pictures are required for a 20 to 30 degrees acquisition. An overall time out can be set to avoid infinite looping in the process.

In one aspect, pictures regular compression algorithms are used to speed up this step of picture computing. These algorithms are non-destructive in order to optimize the frame by frame treatments. For example, non-destructive image compression is used in images formats such as "png", "tiff", "gif", "jpeg2000". The pictures regular compression are adapted from open source algorithms, such as entropy coding or dictionary based compression algorithms. This item also includes server side communications between "cloud server" < > "cloud storage": node 2.1.

Entropy coding is a lossless data compression method that gives a specific code to a specific information, this code being easier to transport than the original coding.

For example, let's assume a picture of a car contains 12 M pixels with 10 M red pixels, the entropy coding will affect the value "1" to the red color instead of the (255,0,0) "usual" color codification. Usual and efficient algorithms that can be easily implemented are "Huffman coding" and, "Shannon-Fano coding", an optimized version of Huffman coding.

Another compression method could be the Lempel-Ziv-Welch-Algorithm (LZW) algorithm. This method of compression assumes that the item to encode is available as a character chain, which is the definition of any digital signal.

The LZW algorithm encodes sequences of characters by creating new characters in a "character dictionary" from read sequences, as seen on the tables of FIG. 9.

The dictionary starts with 2 characters: 0 et 1. While reading the first character "1", it will find the new character "10" made of the 2 first characters of the original chain and will add it to the dictionary (character #2). While reading the second "0", it will had the new character "00" to the dictionary (character #3). While reading the 3rd character of the chain, it will add to the dictionary "01" (character #4). While reading the 4th character, it will add "11" (character #5) to the dictionary. The 5th and 6th character are "1" and "1", which is character #5 of the dictionary. In the meantime, "110" is added to the dictionary as character #6. The compression continues further in the same manner. In the end, the original chain of 15 items is coded with a chain of 8 items.

In one embodiment, server side computing involves many techniques processed simultaneously in order to eliminate non-fitting object from the object database 35, 38. Each time a non-fitting object is eliminated, the technique used to eliminate this non fitting object is remembered, thus giving a weight to the efficiency of this technique for this object 50 to be identified. This weight is then used to prioritize and speed up the process. The weight is also stored for further statistics. For example, should an object 50 have characters on it, all the known objects stored in the database without characters are immediately eliminated; should the red color be identified in an object 50, all known objects without red stored in the database would be eliminated.

Another example is the QR-code or Bar-code: should the object 50 have one of those, the matching would immediately be found and displayed. This specific embodiment is not the purpose of the present disclosure but is given as an example of the recognition process.

It is important to understand that the present system and method is not meant to obtain a dense 3D reconstruction of the object 50. However, 3D points cloud reconstruction can be computed with efficiency and accuracy from several views of the object 50. This is a tradeoff between accuracy and resources: the more views, the more accuracy in the points cloud but the more calculation to compute.

Once the object 50 has been identified after the match search in either the first database 35 or the 3D database 38, the information is returned to the device 10, for display and/or further action on the device 10 under at least one of many forms: 3D interactive representation compatible with all devices, available metadata, 3D printable compatible export . . . This also includes all social networks sharing and usual search engines since text metadata is also embedded with the object 50.

The method for recognition is preferably shown in real time to the user through a user friendly interface. The main parameter is the number of objects still matching from the database. The process ends "OK" when only one object 50 is found, "KO" when no match is found or on time out as explained above. Nevertheless, the user can be asked to help the matching process through simple "MCQ" (Multiple Choice Questions) questions to ease the recognition (node 4.2). Those questions/answers can be very simple: size/dimension, material, brand, family of object 50 (food, accessory, car . . . ), accuracy of 2D capture . . . Those questions can be asked according to at least one of the ongoing process, previous decimations in the objects database and remaining objects metadata.

Figure 10:
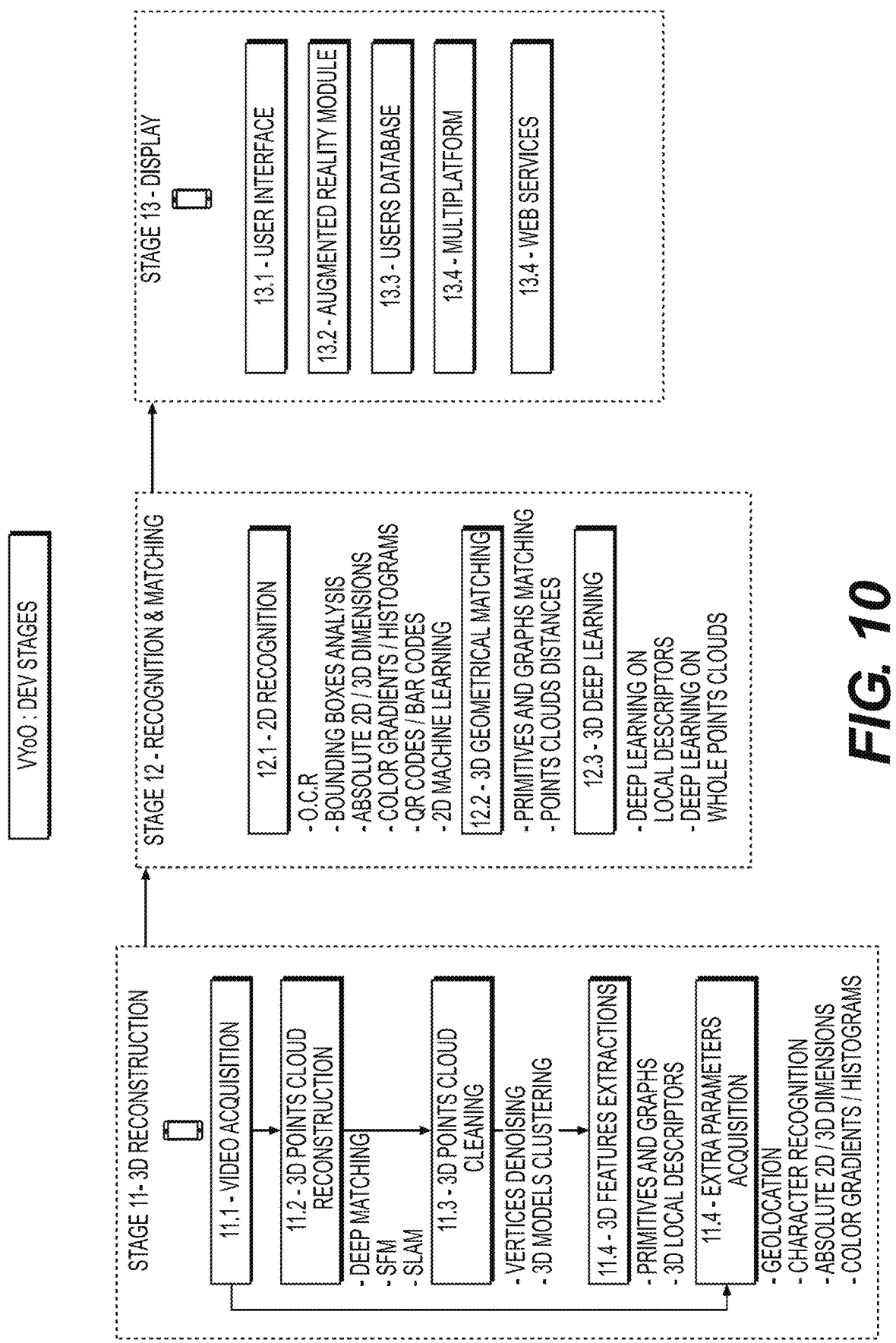
FIGS. 10 and 11 are overview of a method for object recognition in another aspect of the disclosure.
Figure 11:
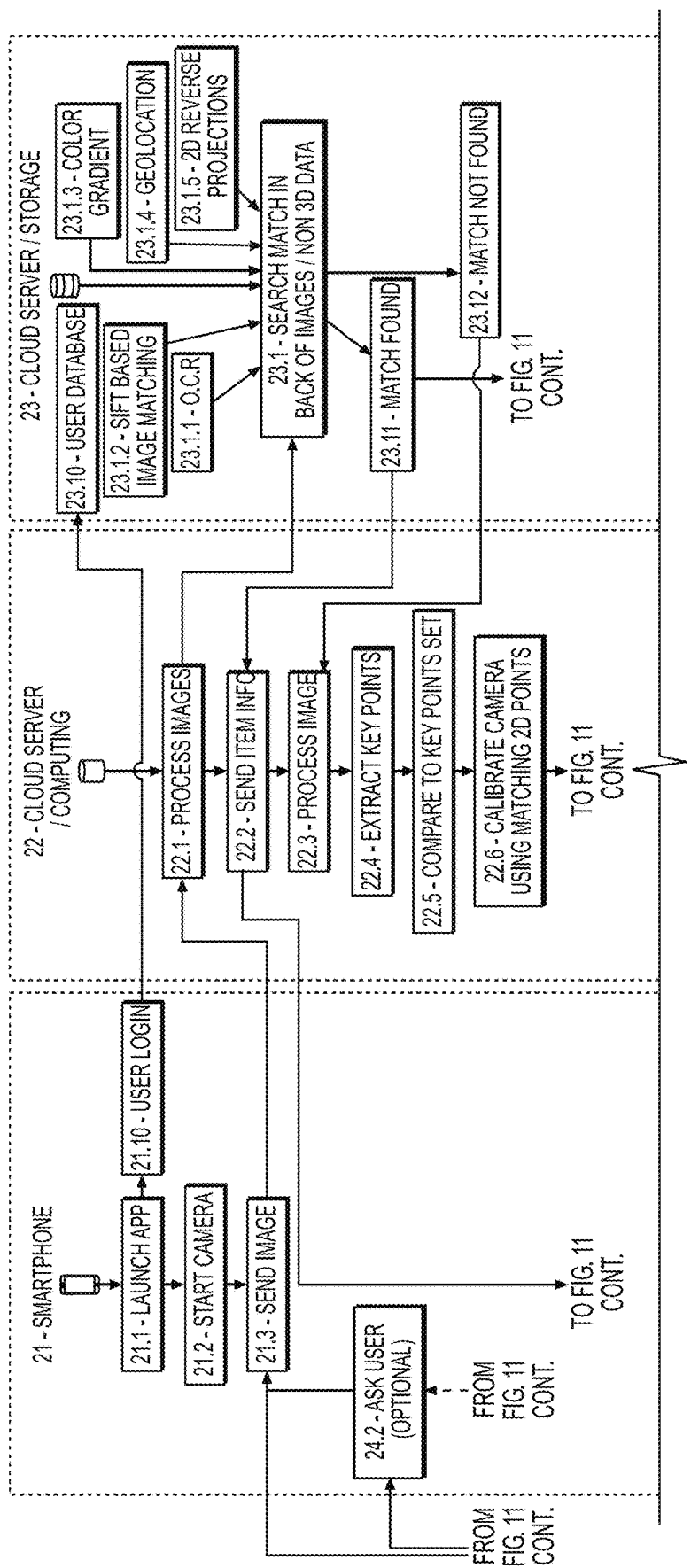
Figure 11:
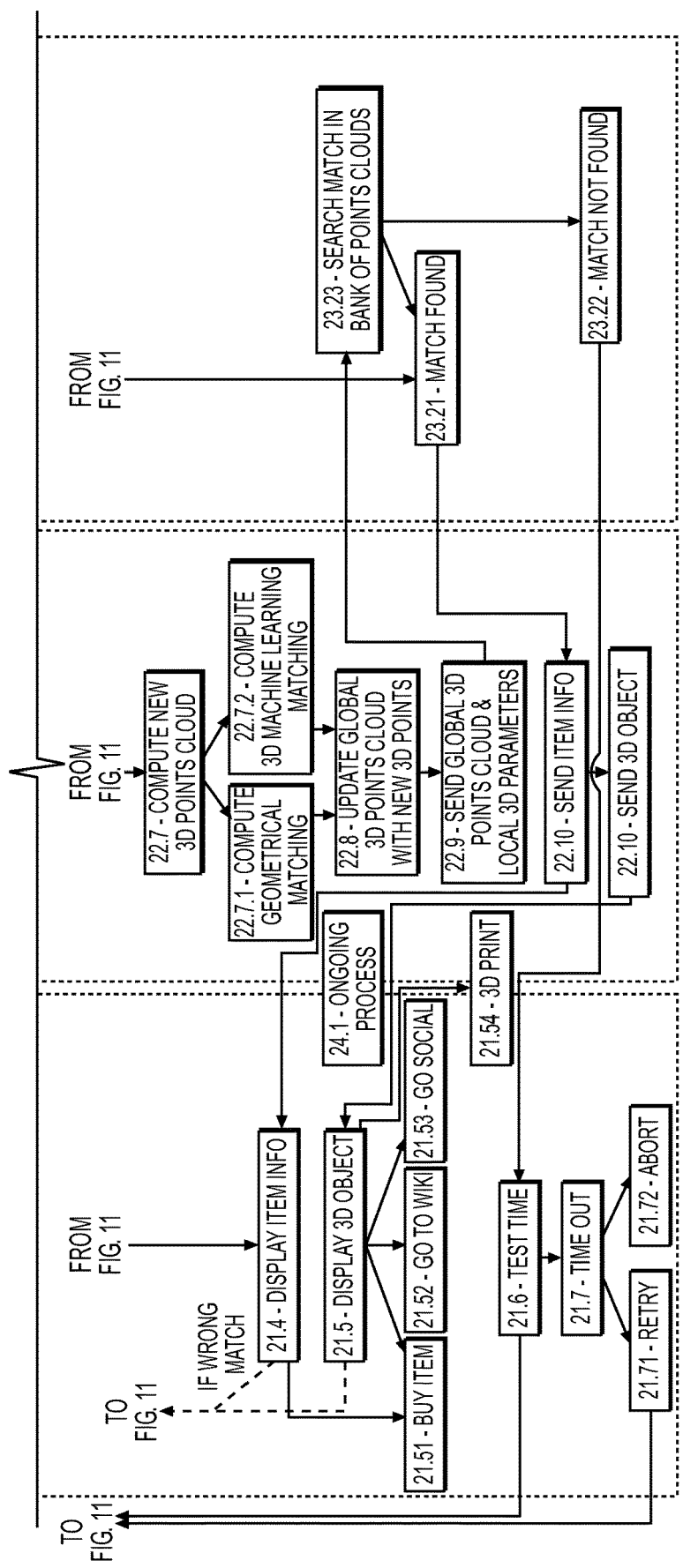
Figure 12:
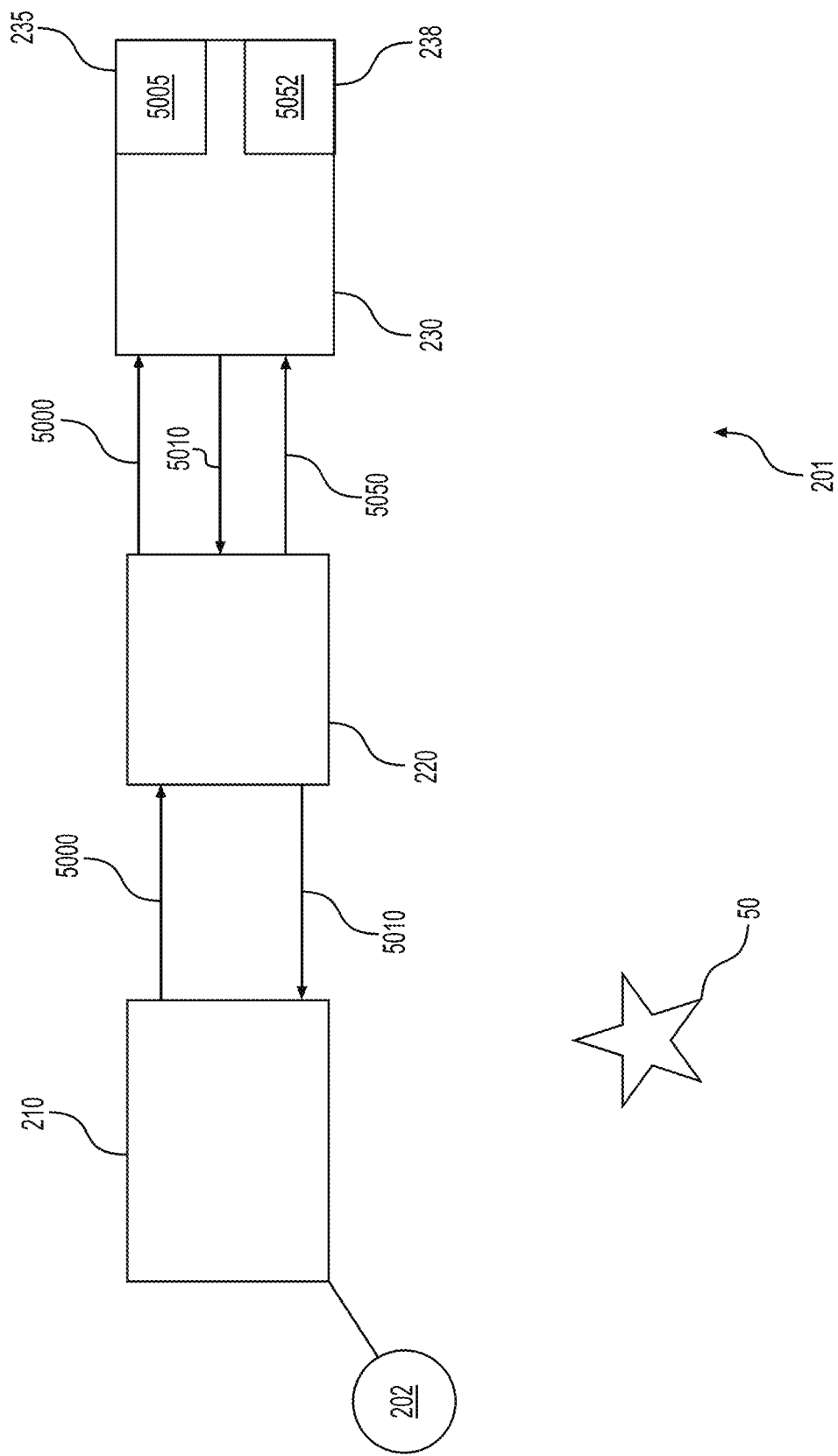
FIG. 12 is an overview of system for object recognition according to one aspect of the disclosure.

FIGS. 10 and 11 are diagrams of methods for recognition in a further aspect of the disclosure and FIG. 12 is an overview of the system 201 for object recognition of an object 50.

The system 201 comprises a device 210, which is used by an end user. The device 210 preferably comprises a display screen, camera and video camera, embedded CPU, storage capacities, a connection to a network. The device 210 may have connections to existing platforms 202, such as M-commerce, 3D printing, CRM, social networks.

For example, the device 210 can be a smartphone, a tablet, a laptop with web cam, a computer, or the like. As will be understood by the skilled person, smartphones and tablets are most efficient devices for the method of the present invention.

The device 210 is connected to a cloud server 220. The cloud server 220 comprises distant CPUs, GPUs or any so called "virtual machines" facilities that can be provided and useful to the improvement of the performances of the invention. This includes for example new generations of processing units dedicated to machine learning, like Google TPUs (Tensor Process Units). The cloud server 220 can be mainly be provided by recognized actors in the domain, such as Azure (Microsoft), AWS (Amazon), Cisco, Google, HP, or more specialized cloud computing provider, as long as the providers offer efficiency, security and a worldwide presence. In one aspect of the disclosure, power and efficiency of the cloud server 220 can be adapted to the amount of calculation to be processed.

The cloud server 220 has a connection to a storage server 230. The storage server 230 is a distance storage involving both objects and user data, as will be explained in the present disclosure. The storage server 230 comprises a first database 235 and a second database 238. The first database 235 comprises stored images in a 2D dimension. The second database 238 comprises stored 3D files of images.

The method for object recognition will now be described in reference with the diagram flow of FIG. 11. The method for object recognition comprises the step of acquiring a plurality of pictures 5000 of an object 50 (node 21.3). In one aspect of the invention, pictures can be acquired or captured by the device 210. Two different acquisition modes can be used: extraction from video or burst mode. In the burst mode, pictures are taken in photographic mode as quick as the device 210 allows it. The skilled person will understand that the acquisition of pictures using extraction from video is more automatic but also more space and CPU consuming. Pictures from a video sequence shot by the video camera of the user's device can be saved every «n» frame, «n» being adjusted dynamically or by the user, representing in some way the «quality» of the 3D scanning. For example, if n<10 frames, the quality is better but the process is slower. On the other hand, if n>50 frames, the scanning is of lower quality but the process faster. In an aspect of the disclosure, «n» is dynamically adjusted, starting with a high value (+/−50 frames) and decreasing as the reconstruction becomes more accurate (+/−10 frames).

The burst mode is more "clever" and should require some fine computing to select "proper" frames, i.e. frames that are useful for a more accurate 3D "cloud points" reconstruction.

It should be noted that objects should preferably been shot from various angles. In case of big objects or objects that cannot be turned around like monuments, only specific angles can be used.

The different pictures 5000 for the object 50 represents different views from the object, from different viewpoints.

The pictures 5000 are acquired until a full set of pictures is acquired.

A set of pictures may be considered completed after a certain acquisition time. For example, an acquisition time estimated to 10-15 seconds might be enough. Preferably, an overall time out can be set to avoid infinite looping in the process.

In one aspect of the disclosure, the length of the acquisition time is dynamic and may be adapted depending on a 3D points cloud reconstruction, as will be explained later in this disclosure with reference to nodes 22.3 to 22.9.

The device 210 sends the acquired plurality of pictures 2000 to the cloud server 220 for cloud computing (node 22.1). As will be explained in the following, a first 2D search match in the databank 35 and/or a 3D cloud reconstruction followed by a second 3D search match is performed.

2D search can be performed as soon as the pictures are received by the system. 3D search can start a soon as reconstructed 3D points are available in reasonable quantity. At a point, those 2 types of research will be performed simultaneously.

The cloud server 220 forwards the plurality of pictures 5000 to the storage server 230.

A first search match in the database 235 may be performed in order to match the acquired pictures with a known image 5005 stored in the first database 235 (node 23.1). including every information that can be useful for recognition.

The first search match is based on 2D image recognition techniques. Those 2D recognition techniques are implemented in the matching algorithm. Different 2 D recognition techniques can be implemented, such as open source techniques. The 2D recognition technique include at least one of O.C.R (node 23.1.1), Scale Invariant Feature Transform—SIFT based image matching (i.e. automatic recognition of key elements in a picture) (node 23.1.2), color gradient analysis (node 23.1.3) giving a precise color map of the object 250. Geolocation information (node 23.1.4) may be used as well.

In one aspect, various match searches in a objects metadata in the database may be performed. The metadata associated with each object in the database includes, if relevant and/or available, geolocation, texts that appear on objects, QR codes or Bar Codes, color histograms of the object, name/model/description of the object, dimensions of the object, public links, price, serial number, reseller info, related company info . . .

Each time a non-fitting object stored in the database 235 is eliminated by either one of these techniques, database indexation is updated in order to ease the overall process.

Node 23.1.5 describe an original approach referred to as "2D reverse projections from 3D objects", explained in FIG. 6 in reference with the first embodiment. The 3D stored models of objects or 3D files of image in the database 235 are provided with complete metadata describing the object. For example, the metadata comprises the following identification data: name, brand, description, size, 2D parameters (colors gradients or maps, o.c.r. data, histograms, Fourier Transformations, samplings . . . ), 3D parameters (points cloud representations, triangulation, textures, materials, size, intrinsic dimensions . . . ). Among these parameters, it is assumed that the 3D representation of the objects generates numerous "random" 2D pictures, for an object. A plurality of 2D pictures 6000 are generated rendered from the 3D stored model, in order to simulate as many users' captures as possible. This includes different random lightings, different random points of view, different random exposures . . . and thus simulate a user's capture. This 2D pictures generation sends back, in 2D pictures, comparison through Hausdorff distance or Kullback-Leibler distance for example.

It should be noted that the 3D models in the database and the automatic generation of random pictures can be used for 2D machine learning training. Machine learning algorithms need an important amount of data for training/learning, and 3D models can provide those in quantity & quality. Using random backgrounds for this CGIs can also be implemented, since it is important that the algorithms learn object in the foreground, not objects in the background. Thus, thousands of pictures can easily be generated in various conditions and constitute very valuable and accurate inputs for machine learning training.

Therefore, the 2D reverse projections from 3D object is adapted to simulate the capture of the object 50 by the user and to propose as many "artificial" pictures 2000 as possible to compare them to the picture set 1000 of the object 50 sent by the user. 2D comparison of the artificial pictures 2000 and of the acquired pictures 1000 is processed along the other techniques for final matching. Mixing those pictures with real ones issued from users' capture sessions is also a powerful way of training 2D machine learning algorithms.

Returning to the step of performing first search and/or metadata matches in the database 235, if the first search match and/or the search in the metadata is successful, the storage server 230 sends item 52010 of relevant information belonging to the known image 5005 back to the cloud server 220 which forwards said item 5010 to the device 210 for display.

The item 5010 may comprise meta data associated with the object, such as identification information of the object, a picture of the object, a localization information of the object, and the like. Other objects metadata may comprise, if relevant and/or available, geolocation, texts that appear on objects, QR codes or Bar Codes, color histograms of the object, name/model/description of the object, dimensions of the object, public links, price, serial number, reseller info, related company info . . .

If the first search match is not successful, the storage server 230 returns the information to the cloud server 220 that the first search match was not successful (node 23.12). The cloud server 220 starts a 3D reconstruction process in order to obtain a cloud of 3D points from the 2D picture set, followed by a followed by a 3D search match. It is to be noted that the 3D process will also start by itself whenever sufficient 3D points clouds can be reconstructed from 2D pictures. A minimum of 5 000 vertices in a point cloud should be considered in order to have reliable information regarding to the size of objects.

This 3D reconstruction process, done by cloud server 220, is shown in nodes 22.3 to 22.9. As will be detailed in the following, the 3D reconstruction process includes an identification of the 2D pictures set, a 2D tracking in the pictures, a 3D points set placement and 3D points cloud reconstruction. openMVG libraries may be used or any libraries known to the skilled person. The method comprises defining an initial set of searchable points in a first picture of the plurality of pictures and identifying some of the searchable points in the remaining pictures of the plurality of pictures, to extract the key points and match them throughout the whole set of pictures. In addition to this "key point based" algorithms, "pixel by pixel" matching is performed through the set of frames ("deep matching"). Resulting of this method, a matching file is generated, giving correspondences between pixels in pairs of pictures. The present invention proposes combining accurate techniques of deep matching with fast and efficient reconstruction algorithms based on Structure From Motion researches for the identification of key points.

The pictures 5000 are processed at node 22.3 to identify the pictures 5000 and extract identification information pertaining to the picture set, such as the acquisition mode, the length of frame acquisition, the identification of frames for the 3D cloud reconstruction.

Using this identification information, a key point extraction process is launched on the pictures 5000, in order in order to extract key points 5030. Key points are defined as being points that can be correlated in as many pictures as possible.

Known performant algorithms to perform "key points" based 3D reconstruction are issued from "Structure From Motion" (SFM) techniques. Nevertheless, these algorithms require 2D pictures that must obey to specific constraints: various textures on objects, lighting parameters, differences in pictures (too much overlapping between pictures introduces biases in the reconstructed movements of the 3D virtual reconstructed camera, as too many differences will lead to poor 2D matching).

Figure 14:
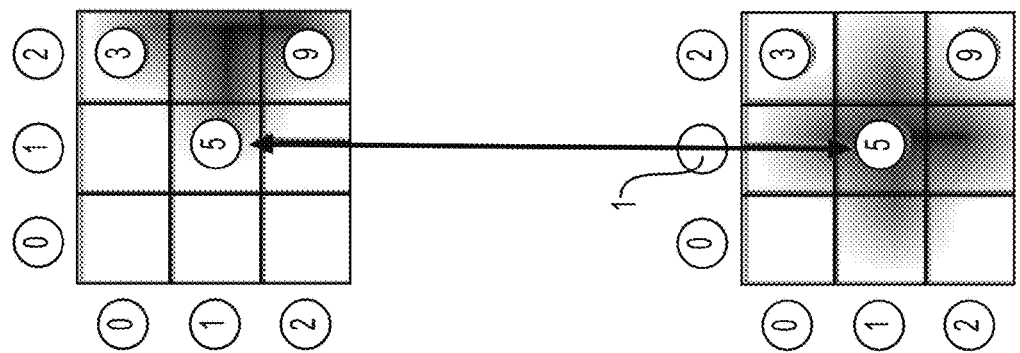
FIG. 14 is an example of SFM matching technique as known in the art.

As known in the art, SFM requires as inputs full lists of scale invariant feature transform (SIFT) describing static and dynamic environments of spotted pixels from one frame to another. SFM matching includes feature description, since only relevant pixels are tracked and associated with the corresponding ones in paired pictures. More precisely, pixels are described, among others, by their immediate environments, and data are extracted as 128 features describing surrounding pixels FIG. 14 shows a first picture (upper) and a second picture with nine pixels and describes the structure of SFM format for the matching file between picture for the upper picture. In this example, only one matching pixel between the two pictures is found. Pixel 5 in the upper picture corresponds to pixel 5 in the second picture. This is this only match, since features including the neighborhood describing for example pixels numbered 3 and 9 in the second picture are too different from features describing pixels numbered 3 and 9 in the first picture (upper picture).

Figure 15:
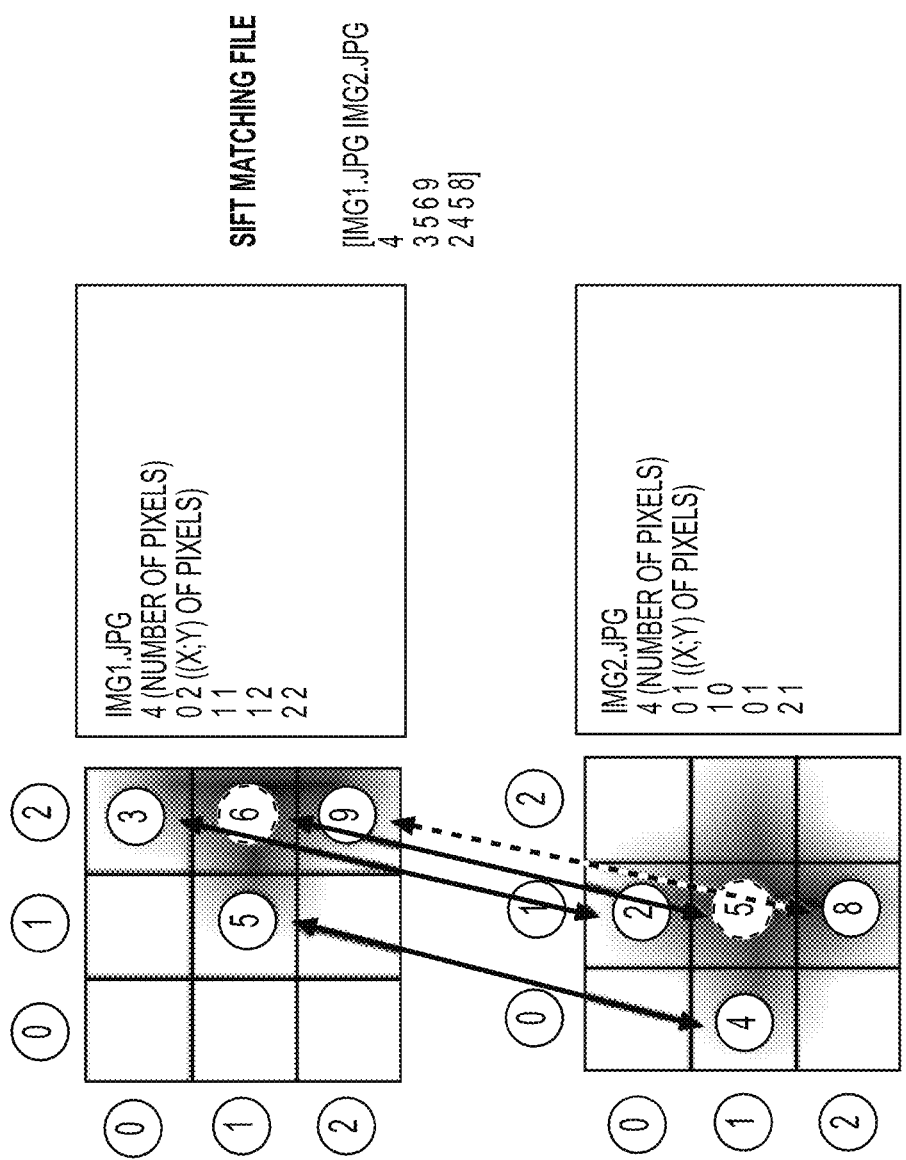
FIG. 15 is an example of deep matching technique as known in the art.

Deep matching, working at the pixel level, gives raw lists of matching pixels $(x_{i,n}; y_{i,n})$ & $(x_{j,p}; y_{j,p})$ in different frames, where n and p are the indexes of 2 pixels in two different frames i and j. Deep matching does not include feature description, since every pixel is tracked and associated with the corresponding ones in paired pictures. Deep matching generates a matching file between pictures FIG. 15 describes a first and second pictures with nine pixels each and the structure of deep matching result. In the example of FIG. 15, four matches are found, in particular pixel numbered 3 in the upper picture matches pixel numbered 2 in the second picture, pixel numbered 5 in in the upper picture matches pixel numbered 4 in the second picture, pixel numbered 6 in the upper picture matches pixel numbered in the second picture and pixel numbered 9 in the upper picture matches pixel numbered 8 in in the second picture.

Therefore, deep matching identifies more matching pixels, which gives much more information in the further reconstructed 3D points cloud. However, deep matching does not output directly information usable in 3 D reconstruction. More precisely, the outputs of deep matching tracking are not compatible with the inputs of SFM reconstruction and the inventors proposed a bridge between those two approaches to build up a full and efficient pipeline Therefore, the present invention proposes combing deep matching techniques and SFM techniques, to obtain file usable in 3 D recognition. In particular, the present invention proposes transforming deep matching files in order to be compatible with SFM ones. In order to have usable 3D reconstruction for the method of recognition according to the present disclosure, those two formats have to be fully and automatically compatible which is a part of the present invention.

This conversion is shown on FIG. 16 and comprises the following steps: 1—Generation of Deep Matching SIFT files and matching file/2—Generation of SFM sift files for the same set of pictures. As explained above with reference to FIGS. 14 and 15, deep matching identifies more matching pixels, i.e. extra matching pixels which were not identified by SFM. Therefore, in a third step, SFM SIFT files are augmented with Deep Matching tracked extra matching pixels in order to add more points to the cloud. After this third step, these added extra matching pixels are not yet usable by reconstruction algorithms. The last step of the conversion therefore comprises computation of compatible feature for the augmented file, i.e. identification and conformation of pixels that haven't been identified by SFM, those pixels being now usable for 3D reconstruction of corresponding voxels, i.e. for reconstructing the 3D points cloud.

The key points 5030 are identified by the above 2D tracking process throughout all the pictures 5000 of the set of pictures, in which each point from a picture is identified in other pictures. If the pictures were acquired though a video, pictures corresponds to frames of the video. In other words, an initial set of searchable points 5032 is defined in a first picture, and the 2D tracking process tries to identify the searchable points 5032 in the other pictures of the set to extract the key points 5030. This is shown on FIGS. 13B and 13C.

The searchable points are refined throughout the process. Points are added, other are suppressed. During the key point extraction process, the set of key points is compared to the initial set of searchable points. Should the number of key points be too low, other searchable points would have to be added to the initial set of searchable points in order to be tracked again. There is no really minimum in the number of key points to be tracked, but the 3D reconstruction and the following comparison process is more efficient with dozens of points. It is to be noted that this process is applied to every pixel in each picture. Refining the 3D points clouds is performed by dynamically extending the range of matching pictures. Indeed, pictures are compared pixel by pixel to others that are "close to it" in the input video/frames sequence, i.e. previous or next pictures. Should the model need to be refined due to a lack of 3D points, pictures will be compared to the "p" preceding/following ones, p being here adjusted dynamically to extend the range of 2D pictures in which the system searches matching pixels.

The skilled person will further understand that it is important that the object 50 has to be motionless while being captured, to allow a successful key point extraction process.

In order to reconstruct 3D points cloud, the "virtual world" is preferably calibrated to obtain a relative measurement system Indeed, the system will generally not be able to calculate absolute dimensions from the pictures set unless there is in at least one picture a distance reference, i.e. an object 50 which size/dimensions are known. Most of the time, this will not be the case. However, the object 50 will have coherent dimensions although it will not have the right size and proportions. For example, should the end user scan a mug, the system will recognize that the object 50 is a mug but won't be able to determine if this is a regular mug or the same mug in a giant version that could be exposed in front of a store as an advertising totem. Nevertheless, the system will send back an "OK" to the user, considering the mug is a regular one that can be found, bought, shared.

The calibration is made using triangulation algorithms. If two or more cameras whose positioning is well known in space see a specific point, triangulation based on elementary trigonometric formulas can determine the exact position of this specific point in space (i.e. in 3 dimensions). In the reverse process, if one tracked point is seen from different viewpoints (even though these different viewpoints are given by one single moving device), these different viewpoints can be positioned in a 3D space relatively to the tracked points, and thus the captured object.

The calibration is done at node 22.5, in which a camera calibration is done using matching 2D points, as explained below.

In order to reconstruct 3D points clouds from sets of pictures, the 2D pictures should be replaced in a 3D environment, by providing the answers to the following questions: where in space are the pictures taken from, and where in space are located the 2D tracked points.

The geometrical system at the time of capture can be represented on FIG. 6, with reference to the system of FIG. 2. The device 10 is represented here through its optical center O and his focal plane ("image plane"). The image of the object 50 is made of numerous points P(X,Y,Z). The correspondence between the camera "C" and the object "P" is given by the following formula: Pc=CP, where Pc is the projection of P on the image plane, C the complete camera calibration matrix. The calibration matrix C is related to the device 10 and remains the same for a whole capture session. For example, C can be a 3×4 matrix (12 unknowns).

The method for reconstruction is thus to calculate the calibration matrix C (calibrating the camera) in a reference frame and then to apply the transformation to other frames in order to position as many P points as possible in the space. It should be noted the object P has 3 coordinates and is thus positioned in a 3D space.

The calibration matrix C is calculated knowing a few correspondences between 3D points and their 2D projections on the camera image plane. 2D projections coordinates are known in the image plane, while 3D coordinates are also known in an arbitrary 3D space (i.e. P could be considered for example as the center of the 3D world). Pc=CP provides 2 equations containing 12 unknowns, meaning that at least 6 correspondences must be known in order to solve C. Those correspondences are determined using fiducial based image processing methods.

Once the calibration matrix C is known, a point Q in space can be found through the reverse equation Q=C−1 Qc, where C and Qc are known. Q has 3 coordinates that are 3 unknowns. It thus requires another point of view with the same camera to solve the system and position Q in the 3D space.

These calculations are made without any indication of the real dimensions in space. The reconstructed objects have the right geometry but there is no indication about their sizes unless there is in the camera field of view another object whose dimension is well known. This is, however, not prerequisite for the present disclosure. Computing tools on geometry and trigonometry can be found in open sources libraries (like openCV or VisualSFM), libraries that are available in open source since June 2000. Those libraries provide numerous tools on digital pictures analysis, such as automatic 3D camera calibration matrixes calculation (calibrateCamera, calibrationMatrixValues . . . ) or, 3D triangulation from different 2D pictures (triangulatePoints).

Once the calibration is done, the key points 5030 identified in the key point extraction step are placed on the object 50. This is illustrated on FIG. 13D.

The 3D points cloud reconstruction is thereafter made as an ongoing process in which 3D vertices (i.e. 3D points) are added in the obtained relative measurement system, at nodes 22.7 and 22.8. Those 3D vertices are added together to build the reconstructed 3D points cloud 5050 as seen on FIG. 13E.

A 3D vertex is the result of the reconstruction allowed from the key points 5030 identified from the pictures 5000.

The result of the 3D points cloud reconstruction is a file comprising a reconstructed 3D points cloud 5050 in a format understandable to 3D software.

A standard file format is a .ply file, which is a regular file format for 3D file. Most 3D software understands and generates this format from and to all other 3D formats (obj, stl, 3DS max, ma, mb . . . ). The ply format is also very efficiently compressible (nondestructive) and transportable through the network, although it is not really an issue here since the 3D points cloud reconstruction and the 3D points cloud comparison are both server side computed.

Figure 17:
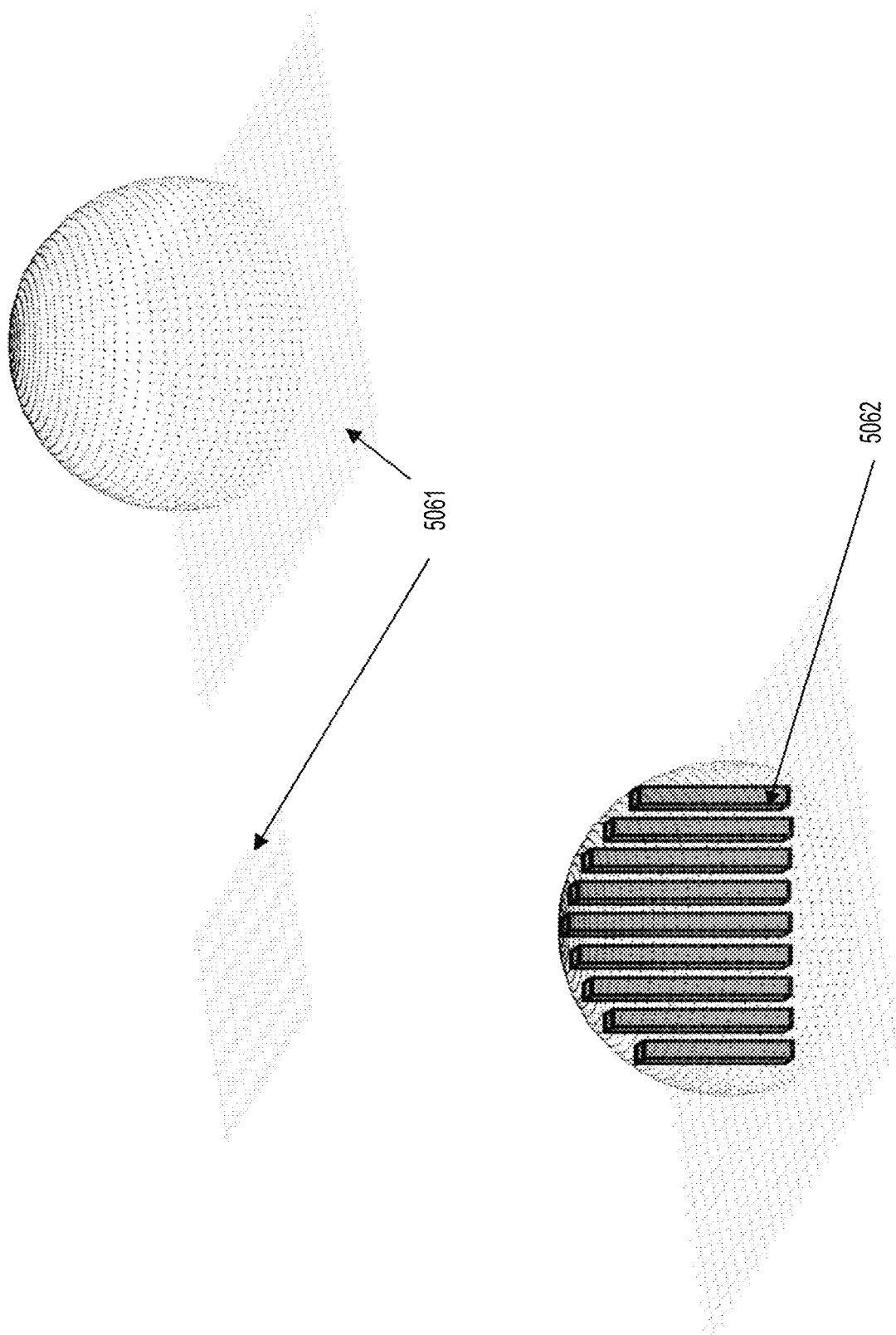
FIG. 17 is an example of volume computation in one aspect of the disclosure.

It should be noted that besides having a metric reference in the scene being shot, another way to calculate an absolute metric is to use a gyroscope and an accelerometer if the device 210 is equipped with those. With combined data provided by accelerometers/gyroscopes now embedded in most portable devices, it is possible without any measure information in the 2D pictures to calculate with a pretty good accuracy the size and measures (2D and 3D) of the 3D reconstructed objects. Absolute 2D dimensions can be provided with a satisfying precision of less than 5% of error, which is usable from the user's point of view. 3D volumes can be computed with an homemade algorithm with only one 2D measurement information (length, height, depth, width . . . ), as detailed with reference to FIG. 17.

First, a planar surface has to be identified in the 3D reconstructed cloud 5050. It can be on the edge of the surface, or just part of the object; A virtual grid 5061 is applied on this surface, splitting the grid into squares, and the whole volume into square based parallelepipeds. The 3D reconstructed volume is automatically filled with parallelepipeds 5062 whose base is the grid's unit square and whose height is delimited by the points cloud. The volume of each parallelepiped "p" is $l^2 \times h_p$, where l is the length of the square of the parallelepiped's base and the $h_p$ height of the parallelepiped "p", each $h_p$ being determined by the surface of the 3D reconstructed points cloud "limiting" the parallelepiped. The volume of the whole points cloud is the sum of all the parallelepipeds" volumes. Heights are given in absolute values so that the calculation is still correct if vertices are located on either half space delimited by the plan of the grid.

The parameter that can be adjusted in order to optimize precision/computational load is the size of the grid's square: the smaller it is, the more precise the volume.

It is therefore intended to use 2D or 3D measures (lengths, dimensions, perimeters, surfaces, volumes . . . ) as one of the criteria for database matching. This is very useful to decimate the database, although one may find useful to have a global scale invariant recognition in order to display every available size of a recognized model. Thus, measurements of scanned object must only be considered as a fine tuning parameter to discriminate identical objects from their sizes (shoes, clothes, is this car a model or a real one? . . . ).

Global measurements can be used as a discriminant criteria considering ratios of 3D objects bounding boxes 5065 dimensions as showed on FIG. 18. Ratios like length/height or depth/height of the bounding boxes are one dimensions rations invariant to scale and are the proof of different objects if they are different.

The reconstructed 3D points cloud 5050 is forwarded to the storage server 230 for a 3D match search (node 22.9 and node 23.23). The 3D match search is done with a 3D points cloud comparison made using the ply files. The comparison compares the user-generated ply file 5050 with known ply files 2052 stored in the 3D database 238. It should be noted that the database ply files 5052, associated with each known object stored in the database, is automatically generated from its 3D model regardless of its original format because the ply files can easily and automatically be generated from most regular files formats. It should be noted that the 3D search match process starts as soon as some 3D points are identified. The 3D search match is then enriched with new reconstructed 3D points as long as the recognition process is going on (i.e. no match is found), giving more and more precision and weight to the 3D part of the recognition.

Two main methods can be used to perform the comparison: 3D geometric comparison or machine learning. The skilled person is aware that 3D geometric comparison is rapidly efficient. Alternative, solutions may be chosen between using existing libraries such as "Points Cloud Libraries" or "Geometry Factory" libraries, which embed root algorithms like point source ray projections, principal component analysis in Eigen-space projections or local sensitivity hashing. Those libraries and root techniques can be applied to compare ply files and find a match, but also to efficiently eliminate non-fitting database objects from the identification process, which is almost as important in the matching process.

Concerning the "purely geometrical" matching (3D geometric comparison), ICP (Iterative Closest Points) algorithms can easily match a 3D reconstructed object with one of a database using factors invariant to scale, thus giving orientation and position matching as shown on FIGS. 19A to 19B. An alignment step is performed, in which the database model is aligned with the reconstructed points cloud 5050 in translation/rotation. This is shown on FIG. 19C.

A denoising of the points clouds is performed as shown in FIG. 19D. The de-noising step is performed through regular techniques "Conditional Removal", "Radius Outlier Removal (ROR)", "Statistic Outlier Removal (SOR)", those being iterative). Segmentation can be done, wherein segmentation consists in eliminating points that would not be present on all captured pictures and use ongoing 3D reconstruction to "segment" the 2D pictures and find some more relevant key points for reconstruction.

However, should segmentation be insufficient or incomplete, as shown on FIG. 20.A where different objects are still remaining in the 3D reconstruction, the present invention proposes adding further an advanced segmentation step which is called "clustering". The difference between segmentation and clustering is mainly that segmentation is processed during the reconstruction whereas clustering is applied on reconstructed points clouds. The aim of the clustering is to separate in the 3d reconstructed point cloud 5050 different reconstructed 3D model coming from different objects seen in the set of 2D pictures. This allows to separate different 3D objects in different clusters of 3D points and thus to perform matching algorithms on each of them for a full recognition process. For example, FIG. 20 shows two clusters that are connected together.

This clustering process is described in FIG. 20B. The 3D reconstructed space resulting of the 3D reconstructed point cloud 5050 is fully sampled with virtual voxels 5095, i.e. 3D cubes, and the number of reconstructed vertices 5051 contained in each of these cubes is counted. When a cube contain to "few" vertices below of a predetermined threshold, those vertices are removed from the reconstructed points cloud 5050. This allows removing remaining noise and thus to separate from each other different groups of vertices 5051 (3D clusters) that can then be considered as separate 3D models. The resulting separation is shown on FIG. 20C, showing two distinct clusters.

It should be noted that the size of those virtual boxes 5095 and the threshold under which the number of vertices is considered as "too small" are variables of the denoising part of the code can be dynamically adjusted from other parameters such as the number of vertices of the whole reconstruction or the minimum distance between 2 vertices in the reconstructed points cloud.

A scaling step is thereafter performed, illustrated in reference with FIGS. 18 and 19E. Recurrent iterations on bounding boxes 5065 in order to match those bounding boxes scale. This operation is a very cheap operation in terms of computational load. Thus, the reconstructed point cloud 5050 and the database point cloud 6050 will fit in all of the 3 features position/rotation/scale and the calculation of the distance between the points clouds can be computed. Search for the minimal distances will give the best match in the database as shown on FIG. 19E.

The above 3D geometric comparison based on geometrical matching is one tool for object recognition.

Machine learning is also very efficient although it needs a high amount of inputs associated to outputs to give good results. Fortunately, the method of the present disclosure allows this high amount of data since database object 50s contain a 3D representation. It is possible to randomly generate a big amount of ply files of any detail level and match them with the known original object 50. This machine learning approach relies on AI algorithms such as HOG linear (Histogram of Oriented Gradients), or cascade classifier of Haar features. It certainly requires an important calculation power since those neural network based techniques are exponential in terms of calculation, but this process can be dealt with independently and upstream the recognition process.

The Machine Learning/Deep Learning process in the present disclosure both involves 2D machine learning and 3D machine learning; this last point being performed on the 3D parameters of the reconstructed object and its subparts, as detailed below.

The invention proposes to identify and treat essential 3D parameters extracted from the 3D adequate reconstruction as key points of an object, such as peaks, tops, edges, shapes, reliefs, as well as its texture, colors, materials . . . More specifically, the first step of the machine learning process is to extract 3D descriptors 6012 and geometrical "primitives" 6013 from 3D reconstructed models of known objects 5060 and from the 3D reconstruction point cloud 5050.

Indeed, any 3D object can be derived from 3D simple objects, called "primitives", such as planes, spheres, cylinders, cones or tori. In a reverse process, any 3D object can be separated in a collection of those elementary shapes, as showed on FIG. 21. Those elementary shapes are then spatially connected to each other through graphs than describe their spatial connectivity to form the whole object as shown on FIG. 22.

Those geometrical primitives 6013 can be considered as so called "bag of features" that can be used for object recognition.

The machine learning model proposed in the present disclosure involves a neural network along with pre-engineering and preprocessing of the data, with the setup of relevant and efficient 3D features vectors as inputs to the neural network. In other words, the invention contains a new way of describing 3D objects that will be usable for Machine Learning/Deep Learning. For this purpose, instead of learning or matching the whole reconstructed points clouds 5050, 6050, local descriptors 6012, 6013, that are related to the object 50.

Those descriptors 6012, 6013 are related to identified vertices 5051 of the plurality of vertices 5051 of the reconstructed 3D point cloud 5050 of the object to be identified, and in comparison with the known reconstructed 3D point cloud 6050 of known object model. The vertices identified to be relevant for the object recognition are considered in their immediate neighborhoods: normal analysis, curvatures radiuses, extraction of edges, corners, submits, planes, local surfaces, local symmetries . . .

Figure 21:
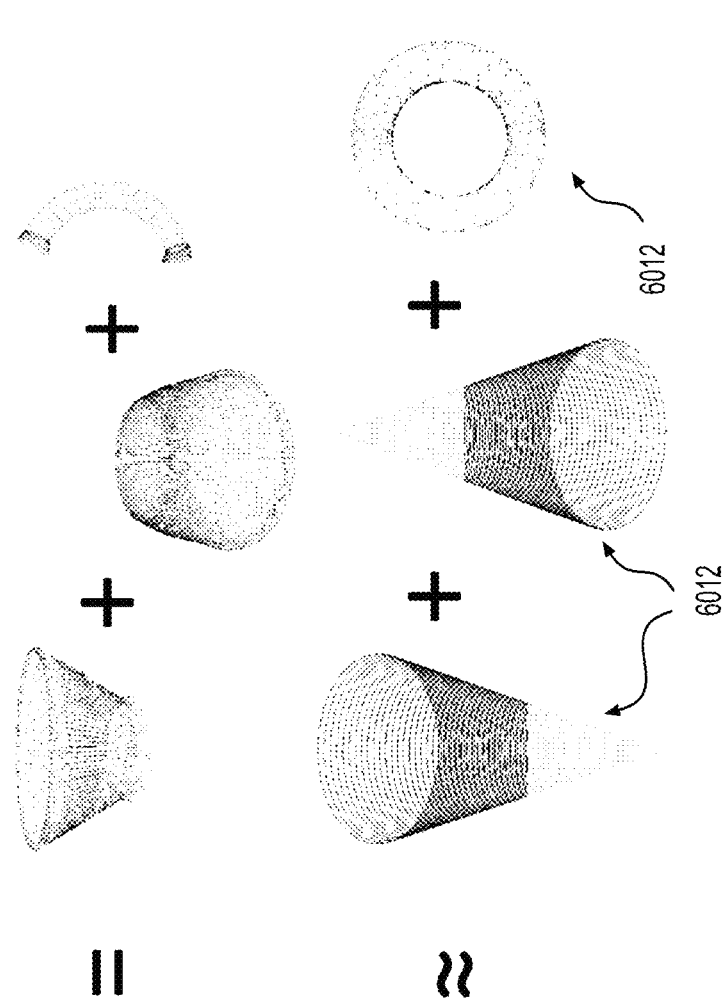
FIGS. 21 and 22 illustrates descriptor and primitives which can be used in a method according to the invention.
Figure 22:
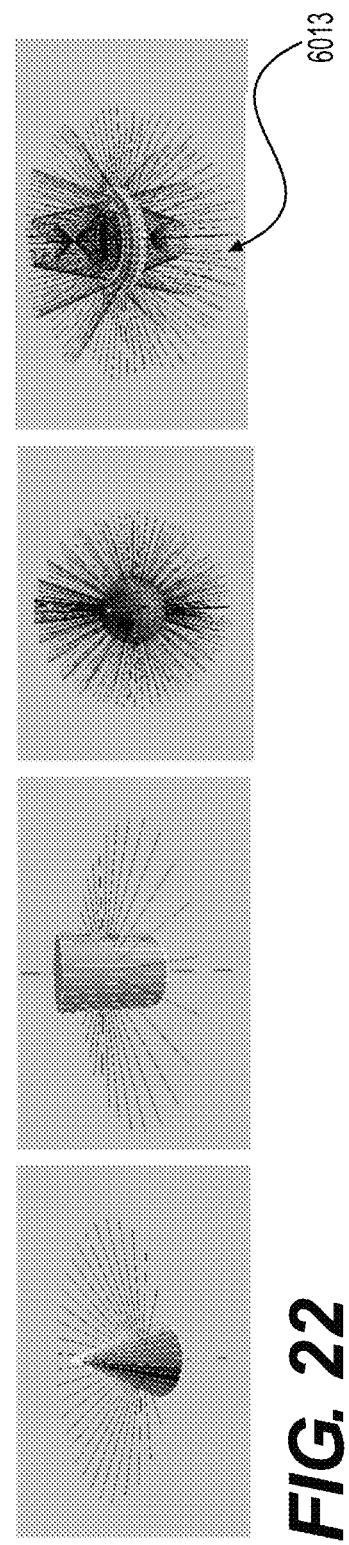

On a further level, the method also uses 3D primitives as descriptors 6012, 6013 since any 3D object can be split in sub objects that are related together as shown on FIGS. 21 and 22. Such local descriptors or primitives are much more convenient to describe than the whole 3D model. For example, 2D normal vectors are used which can be encoded into 3D features vectors both for the database (training/learning) and for the reconstructed objects (matching/recognition). An example of normal vectors organization is given in FIG. 22.

Hence, any local descriptors can be analyzed with fewer parameters than the whole 3D objects. The 3D features vectors used as inputs in the neural network is built according to this structure, i.e. matrices formed by local simplified information linked together with graphs describing their spatial connectivity.

The invention also includes the automation of all the process, enabling the solution to consider "online learning", meaning use of the 3D data acquired by users to augment the reference database. Indeed, the algorithms developed can convert any 3D objects into 3D feature vectors that will themselves be part of the training/learning process.

It is to be noted that the recognition algorithms developed for this invention can also be used on the full 3D reconstructed objects, but that full analysis is more resource and time consuming and give poor results compared to their use on smaller and more identified objects. The combination of matching small objects (primitives) with their connectivity graphs is the key of an efficient matching.

Figure 7:
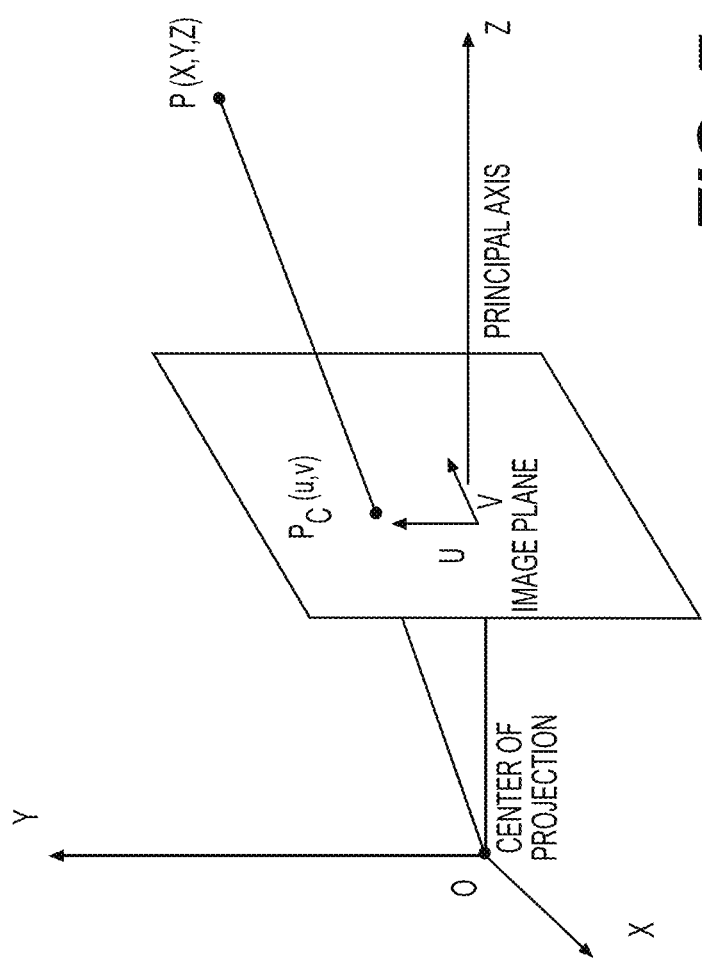
FIG. 7 shows a representation of space which can be used in method of object recognition according to one aspect of the disclosure.

The 3D points cloud reconstruction obtained from pictures as shown on FIG. 5 or on FIG. 13, allows the use of the 3D envelope to do "segmentation" on the reconstructed object, as mentioned earlier in the disclosure. In other words, the 3D object is used in each picture that has been part of the 3D reconstruction to isolate the object in the picture. This is shown on FIG. 7. A matching 3D object from the 3D database 38 is used to isolate relevant information and obtained a histogram 2010 of the segmented picture. This is the segmentation. Segmentation is used in addition to or in combination with further clustering of 3D objects in the reconstructed points cloud in case the points cloud would contain several objects (which the clustering step will reveal). The histogram 2010 of the segmented picture can be compared to histograms 2020 of objects in the database 38 and become a criteria of comparison.

This segmentation offers better performances on matching algorithms described in this disclosure, as for example in O.C.R. (characters recognition)—only relevant characters are kept in the analysis—or in color analysis, giving much more accurate histograms as described on FIG. 8. The skilled person will understand that the method for recognition is an ongoing process. It means that during capture of the pictures data, pictures are sent for computing (node 1.3 & 2.1, or node 21.3 & 22.1). Hence, first treatments of first pictures are computed to obtain a computed object 50 while further pictures data are being acquired for the same object 50 to be identified. Indeed, the skilled person will understand that pictures are taken as long as necessary, meaning as long as the object 50 has not been identified (although an overall time out can be set, as explained above). Hence, as noted above, the length of the acquisition time is dynamic and may be adapted depending on the 3D points cloud reconstruction made from the dynamic picture set. Thus, if the computed points cloud is not sufficient in terms of number of points, the length of the frames acquisition is extended. Gyroscope/accelerometer if available on the device can also be used to fill up empty areas with 2D pictures. For example, it has been established so far that a minimum of 20 pictures is required. Best results are obtained if the angle between two pictures is rather small, about 1 degree; thus, 20 to 30 pictures are required for a 20 to 30 degrees acquisition. An overall time out can be set to avoid infinite looping in the process. An important point to keep in mind in the recognition is the "decimation of the database", i.e. the elimination of every non-matching object as soon as a criteria can allow this. This "decimation" process comes with lowering the weights that are assigned to every potential solution while the process is ongoing as explained in [0081] below.

In one aspect, pictures regular compression algorithms are used to speed up this step of picture computing. These algorithms are non-destructive in order to optimize the frame by frame treatments. For example, non-destructive image compression is used in images formats such as "png", "tiff", "gif", "jpeg2000". The pictures regular compression are adapted from open source algorithms, such as entropy coding or dictionary based compression algorithms. This item also includes server side communications between "cloud server" < > "cloud storage": node 2.1.

Entropy coding is a lossless data compression method that gives a specific code to a specific information, this code being easier to transport than the original coding.

For example, let's assume a picture of a car contains 12 M pixels with 10 M red pixels, the entropy coding will affect the value "1" to the red color instead of the (255,0,0) "usual" color codification. Usual and efficient algorithms that can be easily implemented are "Huffman coding" and, "Shannon-Fano coding", an optimized version of Huffman coding.

Another compression method could be the Lempel-Ziv-Welch-Algorithm (LZW) algorithm. This method of compression assumes that the item to encode is available as a character chain, which is the definition of any digital signal. The LZW algorithm encodes sequences of characters by creating new characters in a "character dictionary" from read sequences, as seen on the tables of FIG. 9.

The dictionary starts with 2 characters: 0 et 1. While reading the first character "1", it will find the new character "10" made of the 2 first characters of the original chain and will add it to the dictionary (character #2). While reading the second "0", it will had the new character "00" to the dictionary (character #3). While reading the 3rd character of the chain, it will add to the dictionary "01" (character #4).

While reading the 4th character, it will add "11" (character #5) to the dictionary. The 5th and 6th character are "1" and "1", which is character #5 of the dictionary. In the meantime, "110" is added to the dictionary as character #6. The compression continues further in the same manner. In the end, the original chain of 15 items is coded with a chain of 8 items.

In one embodiment, server side computing involves many techniques processed simultaneously in order to eliminate non-fitting object from the object database 35, 38. Each time a non-fitting object is eliminated, the technique used to eliminate this non fitting object is remembered, thus giving a weight to the efficiency of this technique for this object 50 to be identified. This weight is then used to prioritize and speed up the process. The weight is also stored for further statistics. For example, should an object 50 have characters on it, all the known objects stored in the database without characters are immediately eliminated; should the red color be identified in an object 50, all known objects without red stored in the database would be eliminated.

Another example is the QR-code or Bar-code: should the object 50 have one of those, the matching would immediately be found and displayed. This specific embodiment is not the purpose of the present disclosure but is given as an example of the recognition process.

It is important to understand that the present system and method is not meant to obtain a dense 3D reconstruction of the object 50. However, 3D points cloud reconstruction can be computed with efficiency and accuracy from several views of the object 50. This is a tradeoff between accuracy and resources: the more views, the more accuracy in the points cloud but the more calculation to compute.

Once the object 50 has been identified after the match search in either the first database 35 or the 3D database 38, the information is returned to the device 10, for display and/or further action on the device 10 under at least one of many forms: 3D interactive representation compatible with all devices, available metadata, 3D printable compatible export . . . This also includes all social networks sharing and usual search engines since text metadata is also embedded with the object 50. It is to be noticed that although it is not part of our invention, the displaying of objects will stay close to the technological evolution and all modern techniques known or to come in these domains. As an example, developments in such fields as Augmented Reality (A.R.) or Virtual Reality (V.R.) are very popular and are to be takin in consideration.

The method for recognition is preferably shown in real time to the user through a user friendly interface. The main parameter is the number of objects still matching from the database. The process ends "OK" when only one object 50 is found, "KO" when no match is found or on time out as explained above. Nevertheless, the user can be asked to help the matching process through simple "MCQ" (Multiple Choice Questions) questions to ease the recognition (node 4.2). Those questions/answers can be very simple: size/dimension, material, brand, family of object 50 (food, accessory, car . . . ), accuracy of 2D capture . . . Those questions can be asked according to at least one of the ongoing process, previous decimations in the objects database and remaining objects metadata. In all of this cases, matching models come with a weight that figures its "score" in the matching process and the "best" scores can be displayed in a friendly user interface that will allow a choice. It is predictable that objects will sometimes be close, like a specific mug or shoe will be close to another mug or shoe. "Close results" will then be displayed, giving useful information to the user.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A computer-implemented method of 3D object recognition, the method comprising:
    acquiring a plurality of pictures of a 3D object;
    reconstructing, from the plurality of pictures, a 3D point cloud reconstruction of the 3D object;
    splitting the 3D point cloud reconstruction into a plurality of 3D descriptors, the 3D descriptors being split into a plurality of 3D primitives spatially connected through a connectivity graph, the connectivity graph describing a spatial connectivity of the 3D primitives forming the 3D object; and
    performing a 3D match search in a 3D database based on the plurality of 3D primitives and the connectivity graph to identify the 3D object.

2. The method of claim 1, wherein performing the 3D match search comprises a comparison of the plurality of 3D primitives and the connectivity graph with 3D primitives and connectivity graphs of known 3D objects stored in the 3D database using at least one of machine learning or 3D geometric comparison.

3. The method of claim 1, wherein the 3D descriptors include ones of planes, spheres, cylinders, cubes, and toms.

4. The method of claim 1, comprising performing a first search match in a first database in which known objects are stored with known metadata associated with the known objects, the first search match being performed using 2D recognition techniques including at least one of Optical Character Recognition, SIFT based imaging, color gradient analysis, and/or the first search match being performed on the metadata.

5. The method of claim 4, in which the steps of the method are performed concurrently, until the object has been identified in at least one of the first database or of the 3D database, in which particular pictures are acquired as long as the object has not been identified or until a time out has been reached, wherein database indexation of the 3D database and/or of the first database is updated each time a known object stored in the 3D database or in the first database is eliminated.

6. The method of claim 1, in which the step of acquiring the plurality of pictures comprises extracting said pictures from a video sequence, the method comprising dynamically adjusting an acquisition parameter depending on the 3D point cloud reconstruction, wherein pictures from the video sequence are saved every "n" frames, and wherein "n" is adjusted dynamically or by the user, and wherein "n" is given a higher value at the start of the method and decreases as the reconstruction becomes more accurate.

7. The method of claim 1, wherein the step of reconstructing the 3D point cloud reconstruction of the object comprises:
- extracting a plurality of key points that can be correlated in said plurality of pictures of the object, wherein at least two pictures of the plurality of pictures show at least two different viewpoints of the object,
- placing the plurality of key points on the object,
- defining a plurality of vertices of the object, wherein a vertex corresponds in 3D to a specific point identified in at least 3 pictures of the object, and
- adding the 3D vertices to build a reconstructed 3D point cloud of the object, to derive the 3D point cloud reconstruction of the object.

8. The method according to claim 7, wherein the step of reconstructing the 3D point cloud reconstruction includes a step of de-noising the 3D point cloud reconstruction, wherein the denoising includes sampling a 3D reconstructed space with a plurality of virtual voxels, counting a number of vertices contained in a virtual voxel, and deleting said vertices contained in the virtual voxel when the number of said vertices in the virtual voxel is below a vertex threshold.

9. The method of claim 8, in which a size of the virtual voxel and the vertex threshold are dynamically adjustable.

10. The method of claim 1, wherein the step of reconstructing the 3D point cloud reconstruction of the object comprises:
- extracting a plurality of key points that can be correlated in said plurality of pictures of the object, wherein at least two pictures of the plurality of pictures show at least two different viewpoints of the object,
- placing the key points on the object,
- defining a plurality of 3D slices of the object, wherein each 3D slice of the plurality of 3D slices comprises at least one key point, and
- using the 3D slices to reconstruct the a 3D point cloud reconstruction of the object.

11. The method of claim 10, comprising computing a calibration matrix in a reference frame to derive a relative measurement system, wherein the 3D slices are added in the obtained relative measurement system.

12. The method of claim 7, comprising defining an initial set of searchable points in a first picture of the plurality of pictures and identifying some of the searchable points in the remaining pictures of the plurality of pictures, to extract the key points.

13. The method of claim 7, wherein the step of extracting the plurality of key points comprises
- generating a Deep Matching SIFT file and a matching file for a set of the plurality of pictures to derive at least one deep matching tracked pixel,
- generating a SFM SIFT file for said set of the plurality of pictures to identify at least one SFM tracked pixel,
- augmenting said SFM SIFT file with extra Deep Matching tracked pixels different from the at least one SFM tracked pixel, and
- conforming said Deep Matching extra tracked pixels to derive a SFM compatible SIFT file.

14. The method of claim 4, comprising displaying in real time information pertaining to the 3D object recognition on the mobile device, wherein the mobile device comprises an input device allowing a user to enter input data concerning the object to be identified, and wherein the first match search or the 3D match search are adapted depending on the input data.

15. A computer program product comprising a non-transitory computer medium having stored therein computer executable instructions that, when executed, cause a computer to perform the steps of the method of claim 1.

16. The method of claim 1, wherein the 3D match search comprises a comparison of the 3D primitives and the connectivity graph with 3D primitives and connectivity graphs of known 3D objects stored in the 3D database.

17. The method of claim 1, wherein the acquiring the plurality of pictures is performed by a mobile device and the reconstructing is performed by a cloud server receiving the plurality of pictures from the mobile device.

* * * * *

UNITED STATES PATENT AND TRADEMARK OFFICE
CERTIFICATE OF CORRECTION

PATENT NO. : 10,922,526 B2
APPLICATION NO. : 16/652927
DATED : February 16, 2021
INVENTOR(S) : Danae Blondel et al.

It is certified that error appears in the above-identified patent and that said Letters Patent is hereby corrected as shown below:

In the Claims

Column 25, Claim 10, Line 36 should read --using the 3D slices to reconstruct the 3D point cloud--

Column 26, Claim 14, Lines 20 and 21 should read --The method of claim 4, comprising displaying information pertaining to the 3D object recognition on--

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*